United States Patent [19]

Nakatani

[11] Patent Number: 4,916,486
[45] Date of Patent: Apr. 10, 1990

[54] COPYING AND PRINTING APPARATUS

[75] Inventor: Keiji Nakatani, Osaka, Japan

[73] Assignee: Minolta Camera Kabushiki Kaisha, Osaka, Japan

[21] Appl. No.: 316,464

[22] Filed: Feb. 24, 1989

[30] Foreign Application Priority Data

| Feb. 25, 1988 | [JP] | Japan | 63-42952 |
| Feb. 25, 1988 | [JP] | Japan | 63-42953 |
| Feb. 25, 1988 | [JP] | Japan | 63-42954 |
| Feb. 25, 1988 | [JP] | Japan | 63-42955 |
| Feb. 25, 1988 | [JP] | Japan | 63-42956 |

[51] Int. Cl.4 .......................... G03G 15/00
[52] U.S. Cl. ........................ 355/202; 101/142; 101/DIG. 37
[58] Field of Search ............ 355/202, 272, 77; 101/450.1, 470, 471, DIG. 37, 451, 142, 468

[56] References Cited

U.S. PATENT DOCUMENTS

| 3,821,931 | 7/1974 | Yamaji et al. | 101/451 X |
| 3,861,306 | 1/1975 | DuBois et al. | 355/202 X |
| 4,080,060 | 3/1978 | Nothmann | 355/77 X |
| 4,134,341 | 1/1979 | Weigele et al. | 355/202 X |
| 4,200,390 | 4/1980 | Tagashira et al. | 355/202 |
| 4,251,153 | 2/1981 | Levine | 355/202 |
| 4,255,041 | 3/1981 | Koumura et al. | 101/470 X |
| 4,696,562 | 9/1987 | Urata et al. | 355/3 R |

FOREIGN PATENT DOCUMENTS

| 58-154869 | 9/1983 | Japan . | |
| 59-221070 | 12/1984 | Japan | 355/202 |
| 61-36769 | 2/1986 | Japan . | |
| 62-240976 | 10/1987 | Japan . | |
| 1215513 | 12/1970 | United Kingdom | 101/142 |

Primary Examiner—R. L. Moses
Attorney, Agent, or Firm—Willian Brinks Olds Hofer Gilson & Lione

[57] ABSTRACT

A copying and printing apparatus comprises a copying system and a printing system. In the copying and printing apparatus, the copying system produces a copy of a document in an electrophotographic process. On the other hand, in the printing system, an image reader reads an image of the document so as to generate image data according to the read image, a master forming section forms a printing master according to the image data generated by the image reader, and a printing section prints using the printing master formed by the master forming section.

15 Claims, 23 Drawing Sheets

COPYING AND PRINTING APPARATUS

BACKGROUND OF THE INVENTION

1. Field of the Invention

The present invention relates to a copying and printing apparatus operable in a copying mode for producing a copy of a document in an electrophotographic process, a master forming mode for forming a printing master corresponding to an image of the document, and a printing mode for printing using the formed printing master.

2. Description of the Related Art

Electrophotographic copying apparatuses comprising a digital printing system are disclosed in the Japanese patent laid open publication Nos. 154869/1983 and 36769/1986 and the U.S. Pat. No. 4,696,562. The apparatuses disclosed in those official gazettes comprise a digital printing system for writing an image onto a photoconductor drum using a laser beam, in addition to an analog copying system. However, since the digital printing system utilizes the electrophotographic process as well as the analog copying system, it has disadvantages proper to the electrophotographic process.

The copying system using the electrophotographic process is suitable for obtaining a few copies of the document at a high efficiency. However, it is not so advantageous to obtain a mass of copies because of an expensive running cost and a comparatively low copying speed.

SUMMARY OF THE INVENTION

An essential object of the present invention is to provide a copying and printing apparatus which is able to perform the analog printing and the digital printing at a high efficiency.

According to one aspect of the present invention, there is provided a copying and printing apparatus comprising: a table for supporting a document thereon; a copying system for produce a copy of the document supported on said table in an electrophotographic process; an image reading system for reading an image of the document supported on said table so as to generate image data according to the read image; a master forming system for forming a printing master according to the image data generated by said image reading system; and a printing system for printing using the printing master formed by said master forming system.

According to another aspect of the present invention, there is provided a copying and printing apparatus comprising: a document supporting means for supporting a document; a light source for illuminating the document supported by said document supporting means; a copying means for producing a copy of the document in an electrophotographic process; an image reading means for reading an image of the document so as to generate image data according to the read image; a transmitting means for transmitting the lightwise image reflected by the document to said copying means and said image reading means; a master forming means for forming a printing master according to the image data generated by said image reading means; and a printing means for printing using the printing master formed by said master forming means.

According to further aspects of the present invention, there is provided a copying and printing apparatus comprising: a document supporting means for supporting a document; a copying means for producing a copy of the document in an electrophotographic process; an image reading means for reading an image of the document so as to generate image data according to the read image; a master forming means for forming a printing master according to the image data generated by said image reading means; a printing means for printing using the printing master formed by said master forming means; an input means for inputting a number of copying or printing paper sheets to be produced; and a control means for activating said copying means when the number of the sheets input by said input means is not larger than a predetermined value, and activating said image reading means, said master forming means and said printing means when the number of the sheets input by said input means is larger than the predetermined value.

According to still further aspect of the present invention, there is provided a copying and printing apparatus comprising: a document supporting means for supporting a document; a light source for illuminating the document supported by said document supporting means; a copying means for producing a copy of the document in an electrophotographic process; an image reading means for reading an image of the document so as to generate image data according to the read image; a transmitting means for transmitting the lightwise image reflecting by the document to said copying means and said image reading means; a master forming means for forming a printing master according to the image data generated by said image reading means; a mode setting means for setting a copying mode for activating said copying means, or a master forming mode for activating said master forming means; a memory means for storing a copying reference exposure amount table comprised of appropriate exposure amounts of the illumination of said light source in the copying mode corresponding to densities of the document, and a master forming reference exposure amount table comprised of appropriate exposure amounts of the illumination of said light source in the master forming mode corresponding to densities of the document; and a control means for setting an appropriate exposure amount of the illumination of said light source for the copying mode based on the image data generated by said image reading means referring to the copying reference exposure amount table stored by said memory means when the copying mode is set by said mode setting mode, and setting an appropriate exposure amount of the illumination of said light source for the master forming mode based on the image data generated by said image reading means referring to the master forming reference exposure amount table stored by said memory means when the master forming mode is set by said mode setting mode.

According to more still further aspect of the present invention, there is provided a copying and printing apparatus comprising: a table for supporting a document thereon; a copying system for produce a copy of the document supported on said table in an electrophotographic process; an image reading system for reading an image of the document supported on said table so as to generate image data according to the read image; a master forming system for forming a printing master according to the image data generated by said image reading system; a printing system for printing using the printing master formed by said master forming system; a mode setting means for setting a copying mode for activating said copying system, or a printing mode for activating said printing system; a copying paper supply means for supplying copying paper sheets; a printing paper supply means for supplying printing paper sheets; a copying paper feeding opening for passing the copying paper sheet therethrough from said copying paper supply means; a printing paper feeding opening for passing the printing paper sheet therethrough from said printing paper supply means; and a paper feeding opening selecting means for selecting said copying paper feeding opening when the copying mode is set by said mode setting means, and selecting said printing paper feeding opening when the printing mode is set by said mode setting means.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENT

The preferred embodiment according to the present invention will be described below.

Description of System

Figure 1:
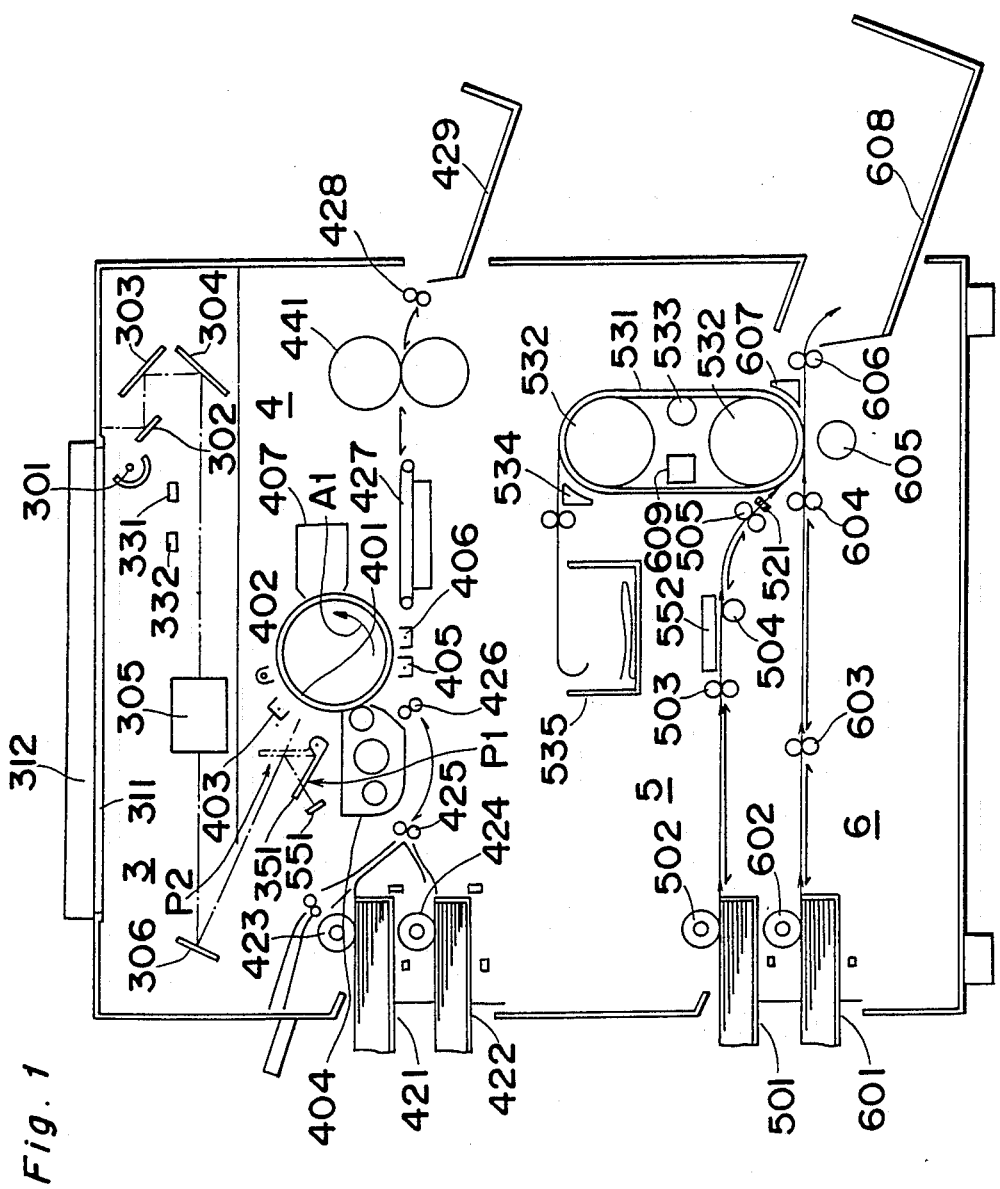
FIG. 1 is a schematic cross-sectional view showing a copying and printing apparatus of the preferred embodiment according to the present invention.

FIG. 1 is a schematic cross-sectional view showing a system of a copying and printing apparatus of the preferred embodiment according to the present invention.

In the upper portion of the apparatus shown in FIG. 1, there is provided an electrophotographic copying system comprising an optical system 3 for reading an image of a document arranged on a document table 311 and forming a latent image corresponding to the image thereof onto a photoconductor drum 401 or projecting the image thereof to a CCD image sensor 551, and a copying section 4 for developing the formed latent image in a visible toner image, transferring and fixing the toner image onto a copying paper sheet. The optical system 3 is characterized in that there is pivotably arranged a switching mirror 351 on the way of the optical path thereof. When the switching mirror 351 is set at the position P1 shown in FIG. 1, the image of the document is formed on the surface of the photoconductor drum 401 (analog copy mode). On the other hand, when the switching mirror 351 is rotated from the position P1 and is set at the position P2 shown in FIG. 1, the image of the document is reflected by the switching mirror 351 and is projected into the CCD image sensor 551. Namely, the same reads the document image and converts it into digital image signals in order to form a printing master.

In the lower portion of the apparatus shown in FIG. 1, there is provided a stencil printer comprising a master forming section 5 for driving a thermal head 552 according to an image signal outputted from the CCD image sensor 551 so as to form a printing master where printing holes corresponding to the image are formed, and a printing section 6 for printing the image onto a printing paper sheet using the printing master formed by the master forming section 5.

(1) Optical System 3

The optical system 3 is provided for exposing and scanning a document arranged on the document table 311 and forming a latent image corresponding to an image thereof onto the photoconductor drum 401.

The optical system 3 comprises an exposure lamp 301, a first mirror 302, a second mirror 303, a third mirror 304, a lens block 305, a fourth mirror 306, and the switching mirror 351 for switching over between a digital optical system and an analog optical system. The switching mirror 351 is set at the position P1 shown in FIG. 1 when the analog optical system is selected, and is set at the position P2 shown in FIG. 1 when the digital optical system is selected.

The exposure lamp 301 and the first mirror 302 are disposed as one body on a first scanner (not shown), and reciprocate in the right and left directions of FIG. 1 along the lower surface of the document table 311 so as to expose and scan the document at the going movement. The second mirror 303 and the third mirror 304 are disposed as one body on a second scanner (not shown), and reciprocate at half the speed of the first scanner at the same direction as the moving direction of the first scanner. The first and second scanners are moved by a scan motor (not shown).

The lens block 305 is used for setting and adjustment of the magnification, and the fourth mirror 306 is used for correcting the position of the image formed on the surface of the photoconductor drum 401 or the CCD image sensor 551. The lens block 305 and the fourth mirror 306 are moved by a magnification motor (not shown).

In the aforementioned optical system 3, when the analog optical system is selected, the switching mirror 351 is set at the position P1 shown in FIG. 1. After the image of the document arranged on the document table 311 and covered by a document table cover 312 is reflected by the first mirror 302, the second mirror 303, and the third mirror 304 sequentially, the image is transmitted through the lens block 305 and are reflected by the fourth mirror 306, and thereafter, the image is formed on the surface of the photoconductor drum 401. On the other hand, when the switching mirror 351 is set at the position P2 shown in FIG. 1 (when the digital optical system is selected), the image reflected by the fourth mirror 306 is reflected by the mirror 351, and is formed on the CCD image sensor 551. It is to be noted that the image sensor is not limited to the CCD image sensor, and an image sensor utilizing MOS type semiconductor or diode array etc. may be used.

(2) Copy Section 4

The copying section 4 is provided for forming an electrostatic latent image on the surface of the photoconductor drum 401 based on the image transmitted from the optical system 3, developing the formed electrostatic latent image in a visible toner image, and transferring and fixing the toner image onto a copying paper sheet.

The copying section 4 comprises the photoconductor drum 401 supported rotatably in a direction indicated by an allow A1 of FIG. 1, and eraser lamp 402, a corona charger 403, a developing device 404, a transfer charger 405, a separating charger 406, a cleaning device 407 respectively arranged around the peripheral surface of the photoconductor drum 401, paper supply cassettes 421 and 422 for respectively supplying the different sizes of copying paper sheets, rollers 423 and 424 for pulling out a copy paper sheet from each of the cassettes 421 and 422, a pair of rollers 425 for transferring the copying paper sheet pulled out, a pair of timing rollers 426 for sending the transferred copying paper sheet to a space positioned between the photoconductor drum 401 and the transfer charger 405 at a predetermined timing, a transport belt 427 for transporting the copying paper sheet left from the photoconductor drum 401, a fixing device 441 for fixing the toner image transferred on the copying paper sheet in a fixing process, a pair of rollers 428 for sending out the copying paper sheet on which the toner image is fixed, and a paper tray 429 for receiving the exhausted paper sheet.

(3) Master Forming Section 5

The master forming section 5 is provided for driving the thermal head 552 according to an image signal transmitted from the CCD image sensor 551 (which is converted from lightwise image to an electric signal by the CCD image sensor 551 and is processed in a predetermined image process by a CPU for the imaging process) so as to heat a printing master sheet, so that portions of the printing master sheet corresponding to the image of a document melt and shrink, and printing holes corresponding to the image are formed therein.

The master forming section 5 comprises a paper supply cassette 501 for supplying printing master sheets, a roller 502 for pulling out the printing master sheet from the cassette 501, a pair of first timing rollers 503 for sending out the printing master sheet to a space positioned between the thermal head 552 and a platen 504 at a predetermined timing, a pair of second timing rollers 505 for twining the printing master sheet, in which the printing holes corresponding to the image are formed, around a printing belt 531 at a predetermined timing, a sensor 521 for detecting the printing master sheet passing therethrough, a printing drum 532 for driving the printing belt 531, an inking roller 533 for performing an inking operation, a separating nail member 534 for separating the printing master sheet from the printing belt 531, and an receiving box 535 for receiving the used printing master sheet.

(4) Printing Section 6

The printing section 6 comprises a paper supply cassette 601 for supplying printing paper sheets, a roller 602 for pulling out the printing paper sheet from the cassette 601, a pair of rollers 603 for transporting the printing paper sheet pulled out, a pair of timing rollers 604 for sending out the transported printing paper sheet to a space positioned between the printing belt 531 and a pressure welding roller 605 at a predetermined timing, a separating nail member 607 for separating the printing paper sheet on which the image is printed from the printing belt 531, a pair of rollers 606 for exhausting the separated printing paper sheet, a tray 608 for receiving the exhausted printing paper sheet, and an ink supply section 609 arranged inside of the printing belt 531 for supplying ink to the printing belt 531.

The cassette 601 for supplying the printing paper sheet is arranged separately from the cassettes 412 and 422 for supplying the copying paper sheet, because the quality of paper sheet required in the printing mode for performing the stencil printing is different from that required in the copying mode using the electrophotographic process. Generally, in the electrophotographic process, it is necessary to use a paper sheet of better quality than that of the stencil printing. On the other hand, in the stencil printing, even though a paper sheet of worse quality is used, any bad effects are almost never given to the quality of image formed on the paper sheet.

Description of Operation Panel

Figure 2:
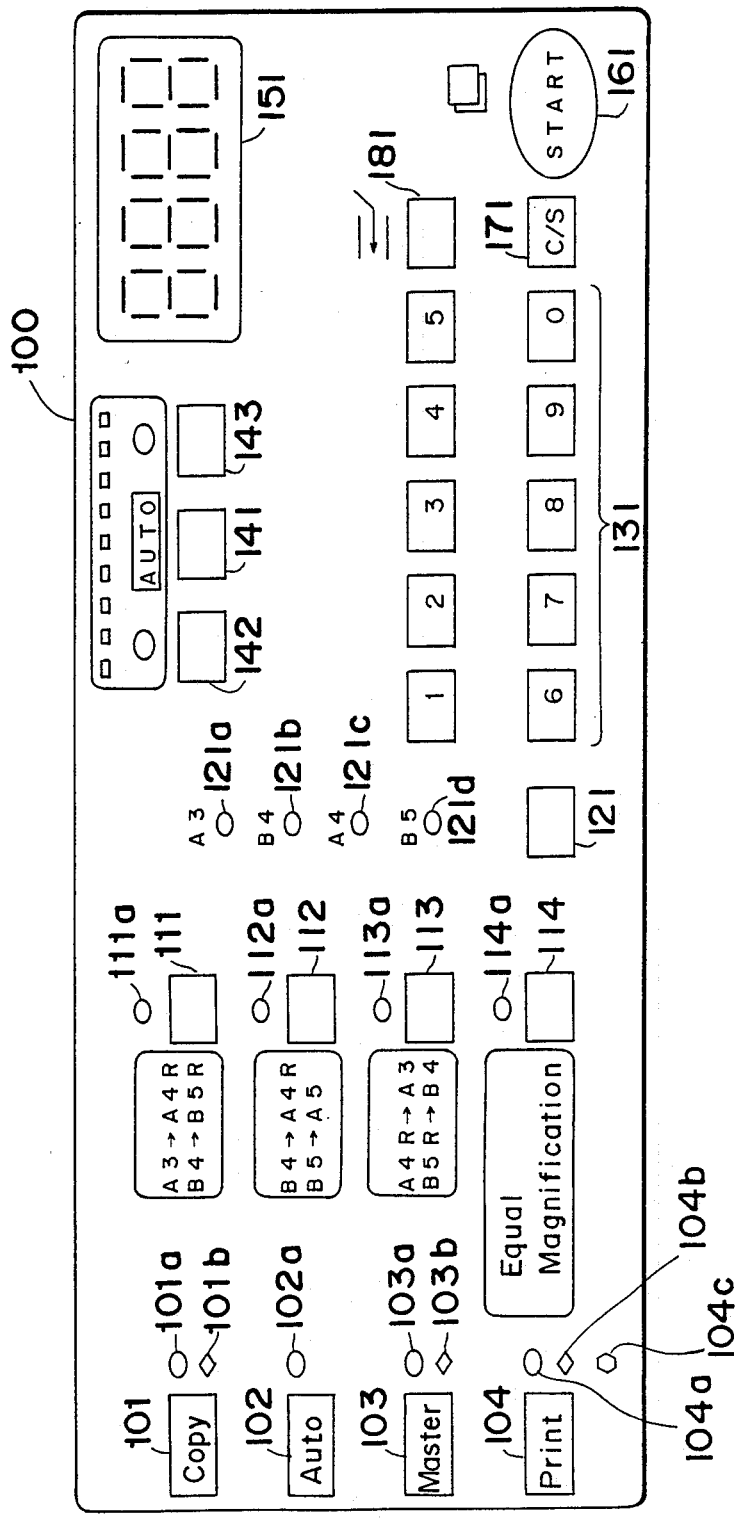
FIG. 2 is a schematic front view showing an operation panel of the copying and printing apparatus shown in FIG. 1.

FIG. 2 is a front view showing an operation panel 100 of the copying and printing apparatus of the present preferred embodiment.

The operation panel 100 is arranged in the vicinity of the document table 311 of the copying and printing apparatus of the present preferred embodiment.

On the operation panel 100, there are arranged a copy instructing key 101 for instructing the setting of the copying mode, a copy instructing display LED 101a for displaying that the key 101 is pressed, a copying mode display LED 101b for displaying that the copy mode is set, an automatic operation instructing key 102 for instructing the setting of the automatic operation mode, an automatic operation instructing display LED 102a for displaying that the key 102 is pressed, a master forming instructing key 103 for instructing the setting of the master forming mode, a master forming instructing display LED 103a for displaying that the key 103 is pressed, a master forming mode display LED 103a for displaying the setting of the master forming mode, a print instructing key 104 for instructing the setting of the printing mode, a print instructing display LED 104a for displaying that the key 104 is pressed, a printing mode display LED 104b for displaying that the printing mode is set, a no master warning display LED 104c for warning that the printing master sheet is run out of in the printing mode, magnification selecting keys 111 to 114 for selecting a predetermined copying magnification, magnification display LEDs 111a to 114a for displaying the selected magnification, a copying paper sheet size selecting key 121 for selecting the size of the copying paper sheets, copying paper sheet size display LEDs 121a to 121d for displaying the selected size of the copying paper sheets, a ten key 131 for inputting numerical values such as the number of copying or printing paper sheets, the copying magnification etc., an automatic exposure instructing key 141 for instructing the setting of an automatic exposure mode, an exposure up key 142 for increasing the exposure amount in a manual manner, an exposure down key 143 for decreasing the exposure amount in a manual manner, a start key 161 for instructing the start of the copying operation, the master forming operation, the printing operation, or a preliminary scan operation, a numerical value display section 151 for displaying the numerical values such as the number of copying or printing paper sheets, the copying magnification etc., an interruption key 181 for instructing the setting of an interruption copying mode, and a clear stop key 171 etc.

Description of Control Circuit

Figure 3:
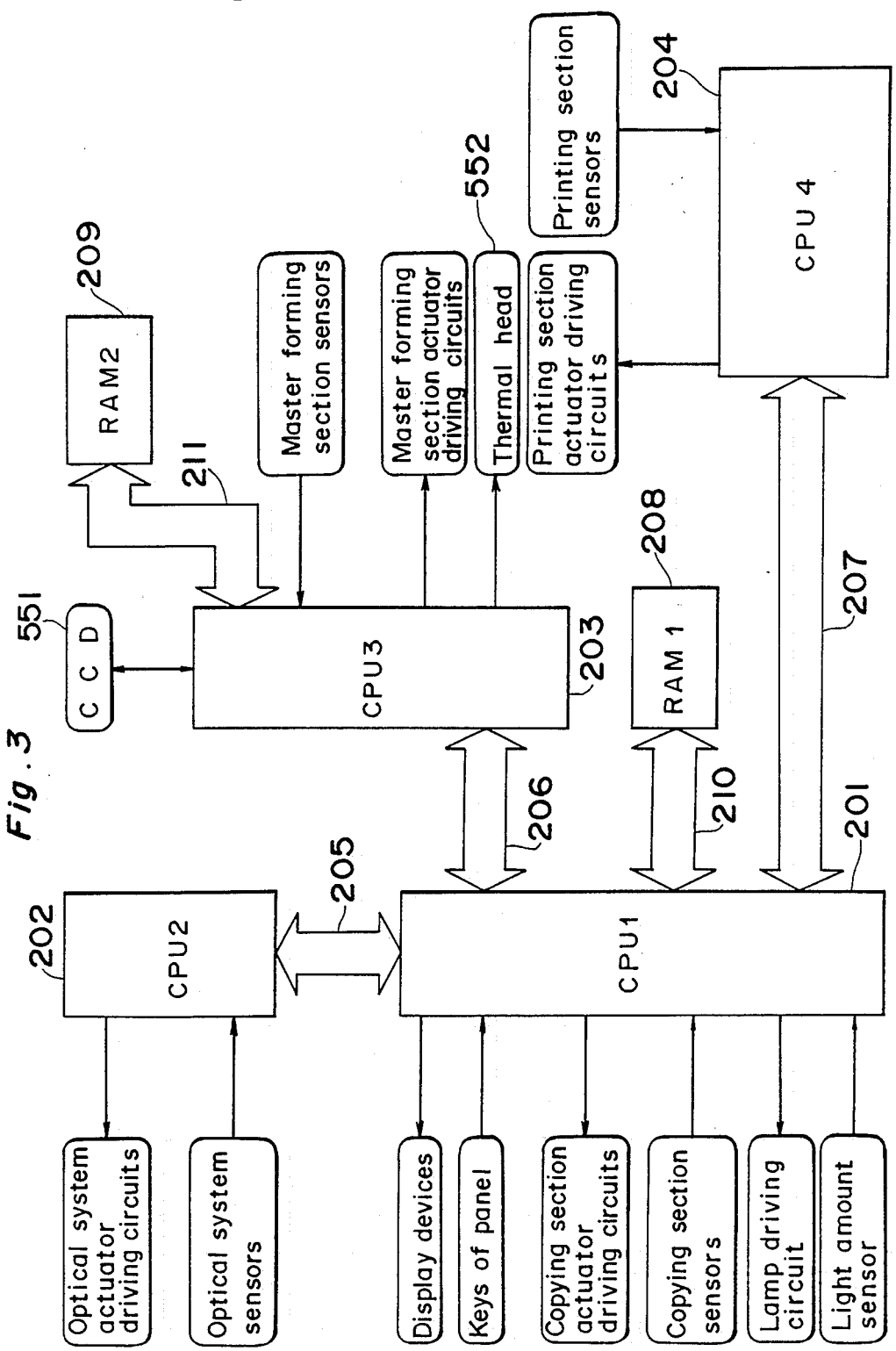
FIG. 3 is a block diagram showing a control circuit of the copying and printing apparatus shown in FIG. 1.

FIG. 3 is a block diagram showing the control circuit of the copying and printing apparatus of the present preferred embodiment.

The control circuit is comprised as a main body of a CPU1 201, a CPU2 202, a CPU3 203, a CPU4 204, a RAM1 208 and a RAM2 209. The CPU1 201 is connected to the CPU2 202, the CPU3 203, the CPU4 204 and the RAM1 208 through bidirectional buses 205, 206, 207 and 210, respectively, so as to communicate with each other, and the CPU3 203 is connected to the RAM2 209 through a bidirectional bus 211 so as to communicate with each other. The CPUs 201 to 204 perform various kinds of control processings.

The CPU1 201 controls the operation of the copying section 4. The CPU1 201 outputs control signals to driving circuits for various kinds of display devices (such as the display LEDs and the numerical display section 151) arranged on the operation panel 100, control signals to driving circuits of various kinds of actuators of the copying section 4 (such as a main motor, the switching mirror 351, the developing device 404, the clutches of the paper feeding rollers 423 to 426, the chargers 403 and 406 etc.), and a control signal to a driving circuit of the exposure lamp 301. The CPU1 201 also inputs signal from sensors arranged at the keys of the operation panel 100 and each portion of the copying section 4 for detecting the operation states thereof, and a signal from a sensor for detecting the exposure amount of the illumination of the exposure lamp 301.

The CPU2 202 controls the operation of the optical system 3. The CPU2 202 outputs control signals to driving circuits for a scan motor (not shown) and the magnification motor (not shown), and also inputs signals from sensors 331 and 332 etc. for detecting the operation states of the optical system 3.

The CPU3 203 controls the operation of the master forming section 5. The CPU3 203 inputs signals from sensors arranged at each portion of the master forming section 5 (such as sensor 521 etc.), and a signal from the CCD image sensor 551 for controlling the drive of the thermal head 552 which is converted from lightwise image to an electric signal by the CCD image sensor 551, and is processed in a predetermined image process by an image processing circuit (not shown). The CPU3 203 also outputs control signals to a driving circuit for the clutch of the paper feeding rollers of the printing master sheet, a driving circuit for the printing drum 532, and driving circuits for various kinds of actuators of the master forming section 5. Furthermore, the CPU3 203 drives the thermal head 552 according to the signal from the CCD image sensor 551.

The CPU4 204 controls the operation of the printing section 6. The CPU4 204 inputs signals from various kinds of sensors arranged at each portion of the printing section 6, and also outputs control signals to driving circuits for the clutches of the respective rollers such as the paper feeding rollers 602 and 603 of the printing paper sheets etc., a driving circuit for controlling the up and down movements of the pressure welding roller 605, and driving circuits for various kinds of actuators of the printing section 6.

Description of Operation

The operation of the copying and printing apparatus of the present preferred embodiment will be described below referring to flow charts shown in FIGS. 4 to 14b.

[1] Description of Main Routine

Figure 4:
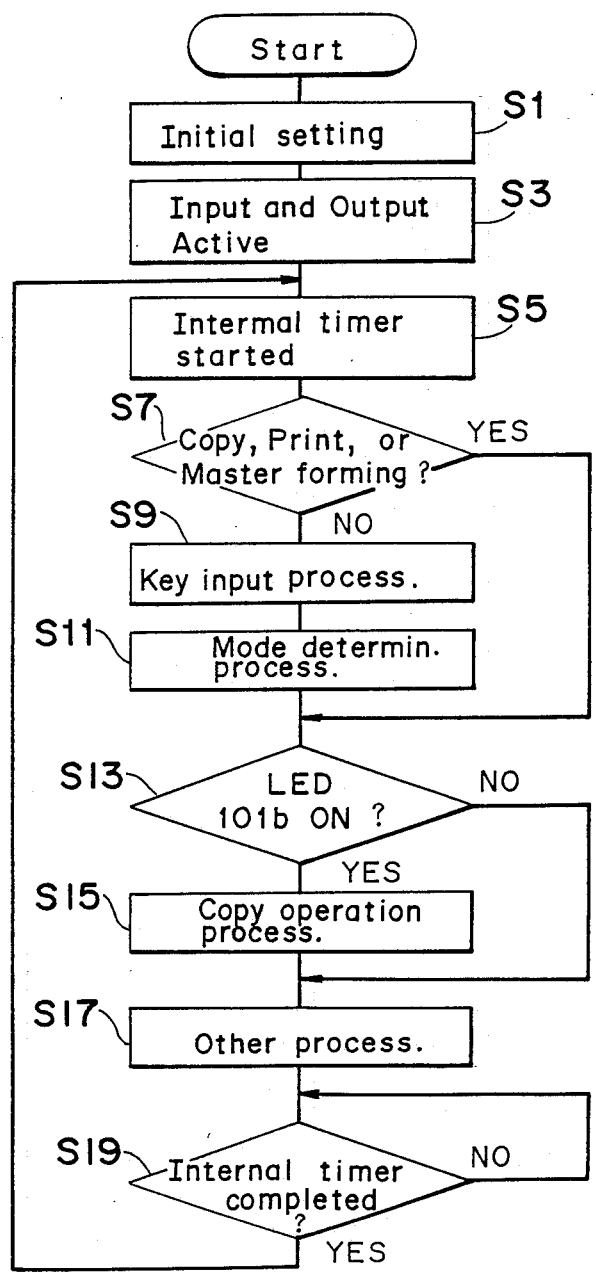
FIG. 4 is a flow chart showing a main routine of a CPU1 of the control circuit of the copying and printing apparatus shown in FIG. 1.
Figure 5A:
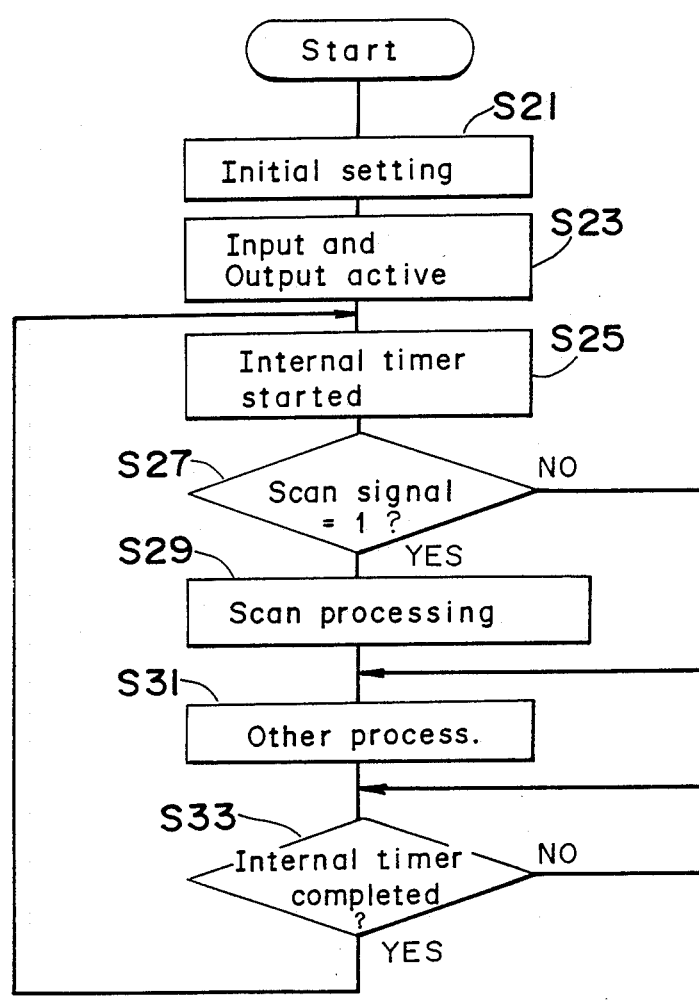
FIGS. 5a and 5b are flow charts showing a main routine of a CPU2 of the control circuit of the copying and printing apparatus shown in FIG. 1.
Figure 5B:
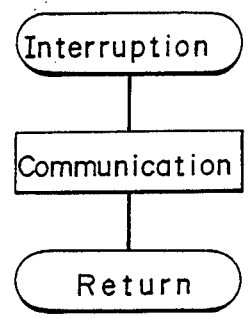
Figure 6A:
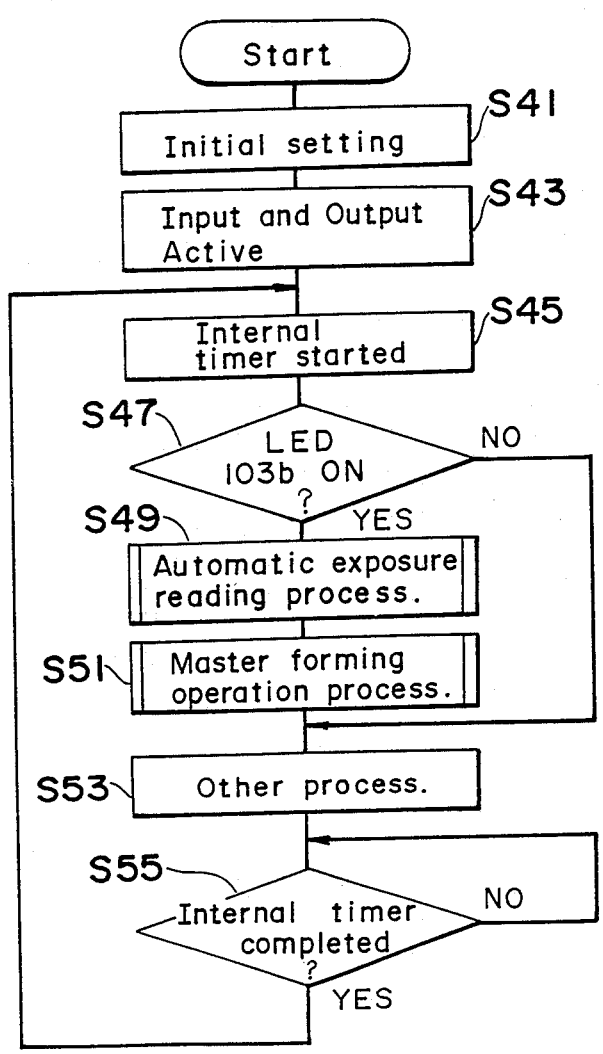
FIGS. 6a and 6b are flow charts showing a main routine of a CPU3 of the control circuit of the copying and printing apparatus shown in FIG. 1.
Figure 6B:
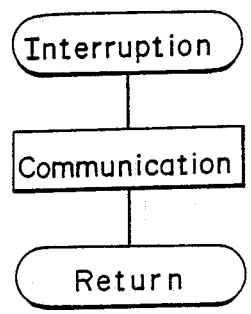
Figure 7A:
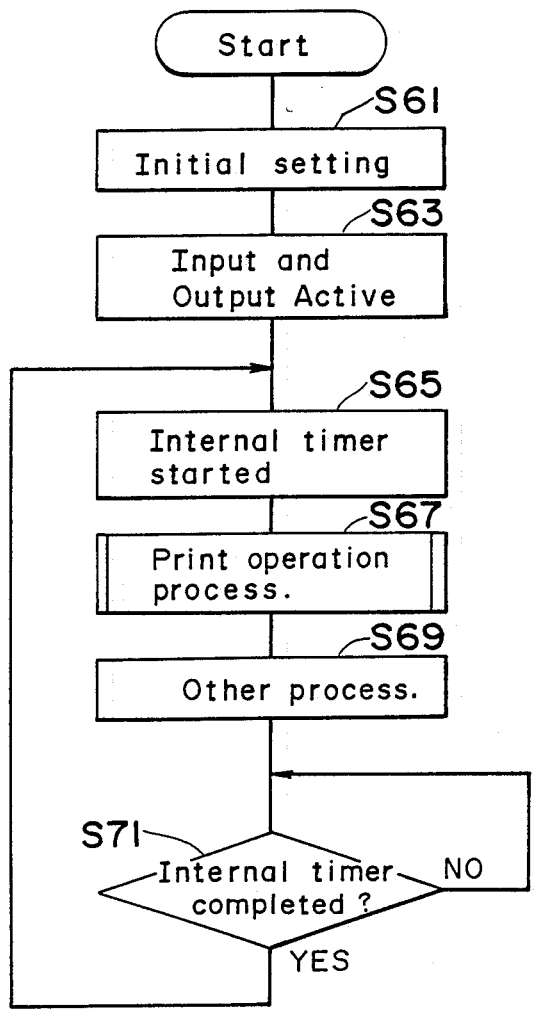
FIGS. 7a and 7b are flow charts showing a main routine of a CPU4 of the control circuit of the copying and printing apparatus shown in FIG. 1.
Figure 7B:
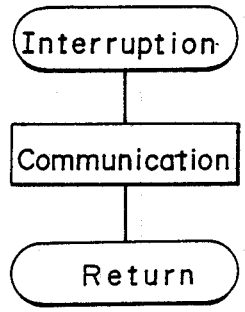
Figure 8A:
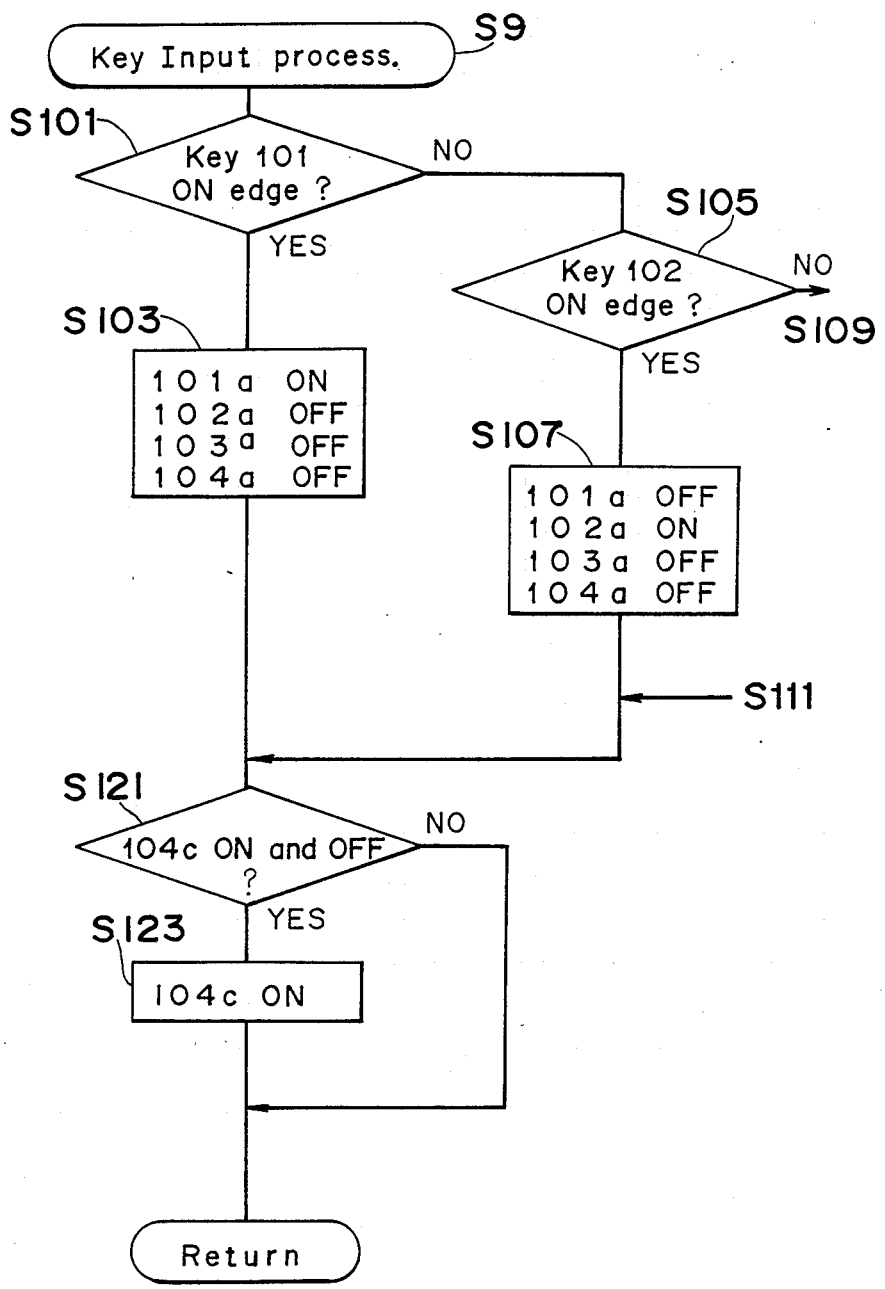
FIGS. 8a to 8d are flow charts showing a key input processing called in the control processing of the CPU1 shown in FIG. 4.
Figure 8B:
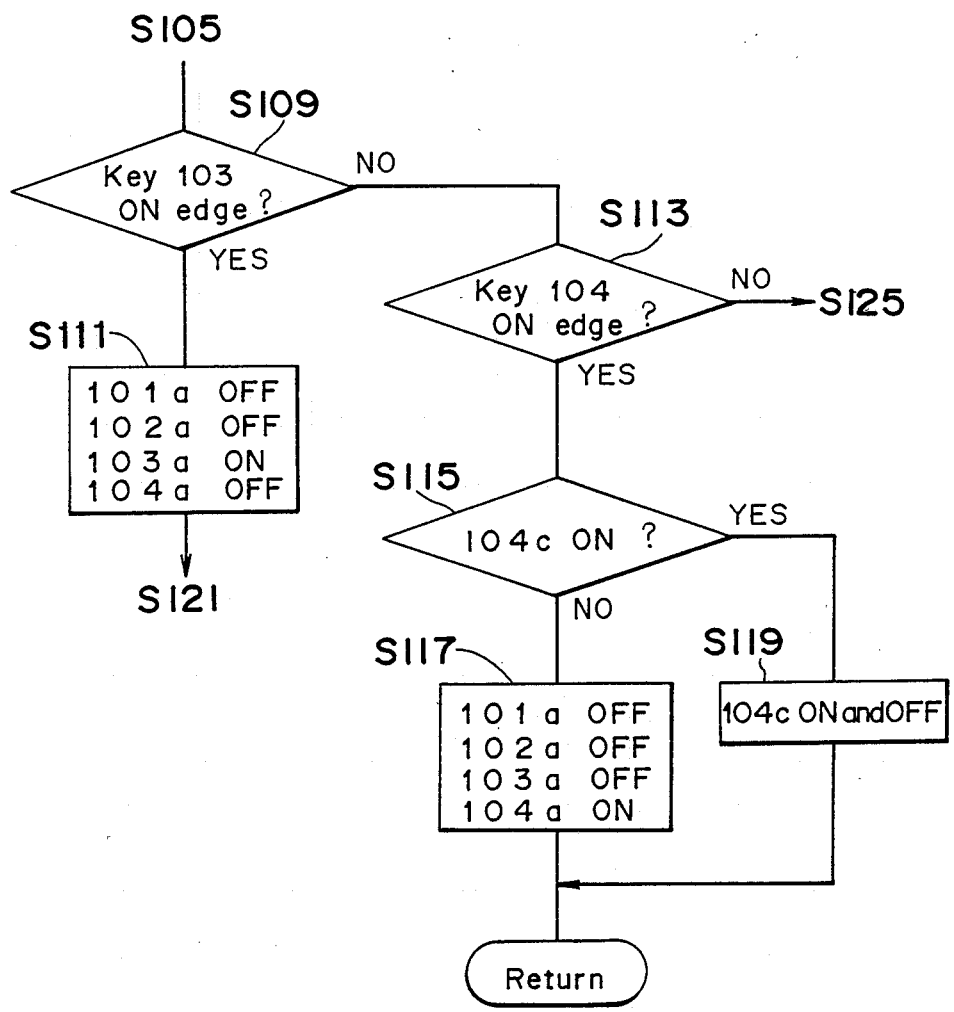
Figure 8C:
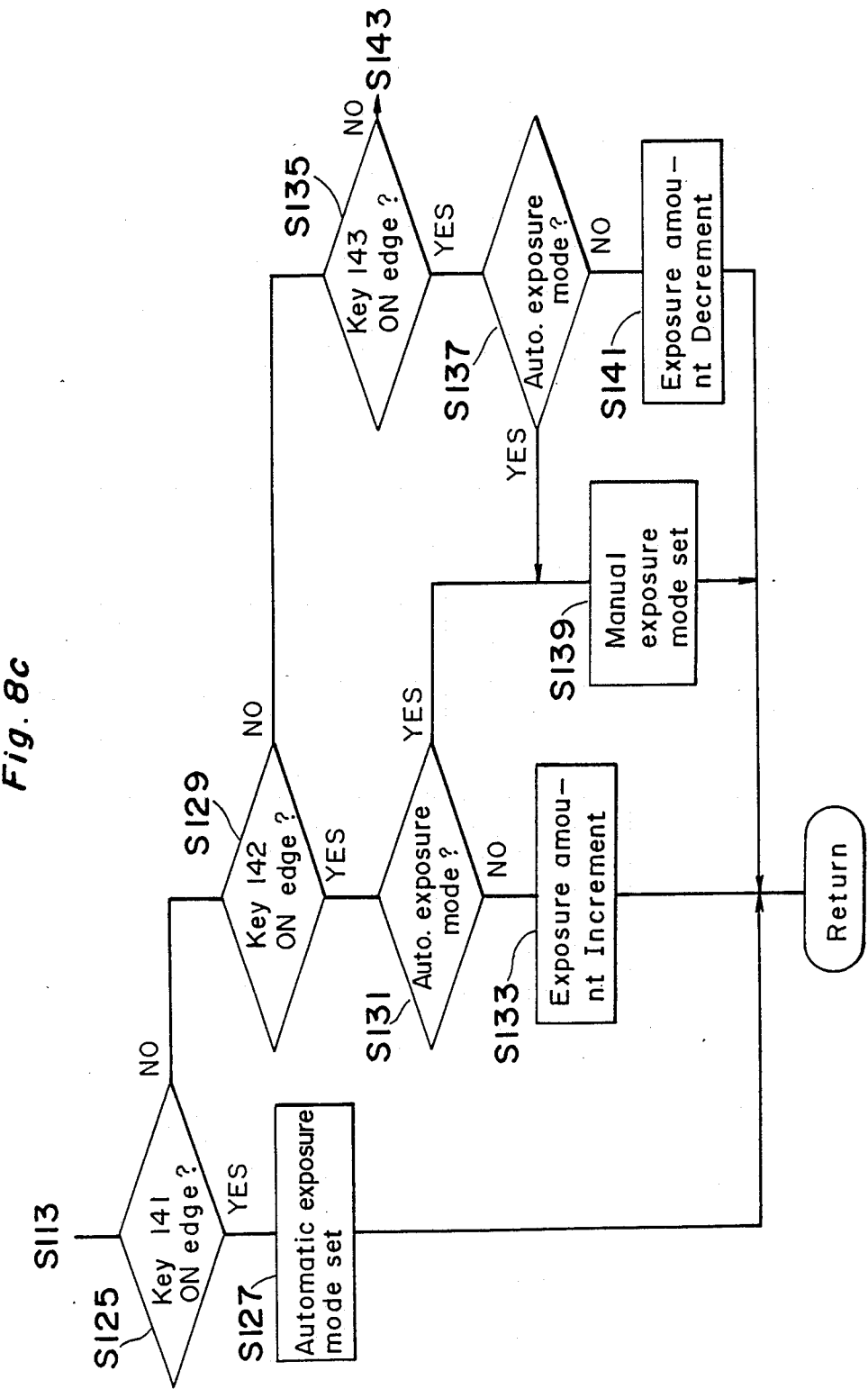
Figure 8D:
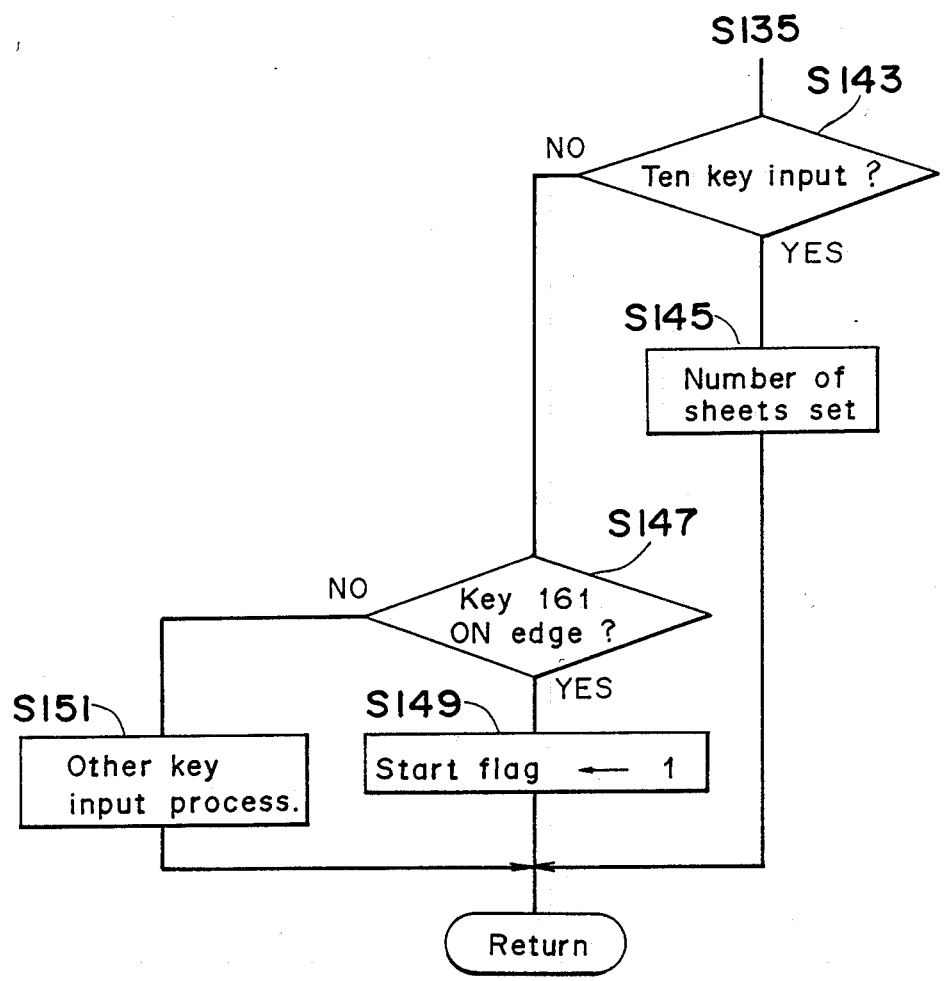

FIG. 4 is a flow chart showing the processing of the main routine of the CPU1, FIGS. 5a and 5b are flow charts showing the processing of the main routine of the CPU2, FIGS. 6a and 6b are flow charts showing the processing of the main routine of the CPU3, and FIGS. 7a and 7b are flow charts showing the processing of the main routine of the CPU4. It is to be noted that the respective CPUs communicate with each other according to the interruption processings shown in FIGS. 5b, 6b and 7b.

(1) CPU1 (FIG. 4)

The CPU1 controls the operation of the copying section 4. The CPU1 starts the processing thereof, for example, when the power is turned on. Thereafter, the CPU1 sets an initial state at step S1, and makes input and output devices active at step S3.

An internal timer of the CPU1 is started at step S5. Thereafter, when the copying operation, the printing operation and the master forming operation are not performed (No at step S7), a key input processing subroutine (step S9) and a mode determination processing subroutine (step S11) are executed. On the other hand, when the copying operation, the printing operation or the master forming operation are performed (Yes at Step S7), the program flow goes to step S13.

When the copying mode display LED 101b is turned on and the copying mode is set (Yes at step S13), a copying operation processing subroutine is executed at step S15. On the other hand, when the copying mode display LED 101b is turned off (No at step S13), the program flow goes to step S17.

Thereafter, the other processings (which are the processings of the CPU1 and are not described herein such as the temperature control of the fixing roller etc., and the similar processings of the CPU2, the CPU3 and the CPU4 thereto are referred to as the other processings hereinafter) are executed at step S17.

Thereafter, when the internal timer started at step S5 counts a predetermined time interval (Yes at step S19), the program flow goes back to step S5, and the above processings are executed repeatedly.

The respective subroutines executed at step S9, S11 and S15 are described below in detail.

(2) CPU2 (FIGS. 5a and 5b)

The CPU2 controls the operation of the optical system 3. The CPU2 starts the processing thereof, for example, when the power is turned on. Thereafter, the CPU2 sets an initial state at step S21, and makes input and output devices active at step S23.

An internal timer of the CPU2 is started at step S25. Thereafter, when the ON edge of a scan signal transmitted from the CPU1 or the CPU3 is detected (when the scan signal changes from the OFF state to the ON state) (Yes at step S27), a scan processing is executed at step S29. In the scan processing, the moving speed and the moving direction etc., of the first scanner (not shown) on which the exposure lamp 301 and the first mirror 302 are arranged and the second scanner (not shown) on which the second mirror 303 and the third mirror 304 are arranged, are controlled. At a timing when the scanners pass through the positions of the sensors 331 and 332, a predetermined timing signal and a predetermined return signal are generated and are transmitted to the CPU1 and the CPU3. Thereafter, the other processings are executed at step S31.

Thereafter, when the internal timer started at step S25 counts a predetermined time interval (Yes at step S33), the program flow goes back to step S25, and the above processings are executed repeatedly.

It is to be noted that the following processing omitted in FIGS. 5a and 5b is executed. That is, a scan flag is set when the ON edge of the scan signal is detected, and the scan processing is executed while the scan flag is set. Thereafter, when the scan processing is completed, the scan flag is reset.

(3) CPU3 (FIGS. 6a and 6b)

The CPU controls the operation of the master forming section 5. The CPU3 starts the processing thereof, for example, when the power is turned on. Thereafter, the CPU3 sets an initial state at step S41, and makes input and output devices active at step S43.

An internal timer of the CPU3 is started at step S45. Thereafter, when the master forming mode display LED 103b is turned on and the master forming mode is set (Yes at step S47), an automatic exposure reading processing subroutine (step S49) and a master forming operation processing subroutine (step S51) are executed. On the other hand, when the master forming mode display LED 103b is turned off (No at step S47), the program flow goes to step S53. Thereafter, the other processings are executed at step S53.

Thereafter, when the internal timer started at step S45 counts a predetermined time interval (Yes at step S55), the program flow goes back to step S45, and the above processings are executed repeatedly.

The respective subroutines executed at step S49 and S51 are described below in detail.

(4) CPU4 (FIGS. 7a and 7b)

The CPU4 controls the operation of the printing section 6. The CPU4 starts the processing thereof, for example, when the power is turned on. Thereafter, the CPU4 sets an initial state at step S61, and makes input and output devices active at step S63.

An internal timer of the CPU4 is started at step S65. Thereafter, a printing operation processing subroutine (step S67) is executed and the other processings are executed at step S69.

Thereafter, when the internal timer started at step S65 counts a predetermined time interval (Yes at step S71), the program flow goes back to step S65, and the above processings are executed repeatedly.

The subroutine executed at step S67 is described below in detail.

[2] Description of Respective Subroutines

The respective subroutines will be described below.

(1) Key Input Processing (FIGS. 8a to 8d)

The key input processing subroutine is called at step S9 shown in FIG. 4 of the processing of the CPU1, and it is a processing for the input operation of various kind of key switches arranged on the operation panel 100.

Steps S101 to S123 are the input processings for the keys 101 to 104.

When the ON edge of the key 101 is detected (Yes at steps S101), the copy instruction display LED 101a is turned on, and the automatic operation instructing display LED 102a, the master forming instructing display LED 103a, and the print instructing display LED 104a are turned off at step S103.

When the ON edge of the key 102 is detected (Yes at step S105), the automatic operation instructing display LED 102a is turned on, and the copy instructing display LED 101a, the master forming instructing display LED 103a, and the print instructing display LED 104a are turned off at step S103.

When the ON edge of the key 103 is detected (Yes at step S109), the master forming instructing display LED 103a is turned on, and the copy instructing display LED 101a, the automatic operation instructing display LED 102a, and the print instructing display LED 104a are turned off at step S111.

When the ON edge of the key 104 is detected (Yes at step S113), it is judged whether or not the no master warning display LED 104c is turned on at step S115. When the LED 104c is turned off and the printing master sheet is mounted (No at step S115), the print instructing display LED 104a is turned on, and the copy instructing display LED 101a, the automatic operation instructing display LED 102a, and the master forming instructing display LED 103a are turned off at step S117. On the other hand, when the LED 104c is turned on and it is judged that any printing master sheet is not mounted (Yes at step S115), the no master warning display LED 104c is turned on and off at step S119 so as to warn that the printing master sheet is run out of. The turning on and off state of the no matter warning display LED 104c is canceled when the key 101, the key 102 or the key 103 are pressed (at steps S121 and S123).

Steps S125 to S141 are the input processings for the keys 141 to 143 in relation to the adjustment of the exposure amount.

When the ON edge of the automatic exposure instructing key 141 is detected (Yes at step S125), the automatic exposure mode is set at step S127.

When the ON edge of the exposure up key 142 is detected (Yes at step S129), it is judged whether or not the automatic exposure mode is set at step S131. When the automatic exposure mode is not set (No at step S131), the exposure amount is increased by a predetermined step amount at step S133. On the other hand, when the automatic exposure mode is set (Yes at step S131), the set automatic exposure mode is canceled and the manual exposure mode is set at step S139.

When the ON edge of the exposure down key 143 is detected (Yes at step S135), the same processings as those of the exposure up key 142 are executed at steps S135, S137, S139 and S141.

Step S143 to S145 are the processings for setting the input numerical value as the number of copying or printing paper sheets when the numerical value data are input by the ten key 131. Since the processing for setting the number of copying or printing paper sheets is executed in a known manner, the description of the processing is omitted herein.

Steps S147 to S149 are the processings for setting a start flag (step S149) when the ON edge of the start key 161 is detected (Yes at step S147). The start flag is used for instructing the start of respective processings described below, therefore, only when the start flag is set, the respective processings are executed.

Step S151 is the input processings for the other keys such as the copying paper sheet size selecting key 121, the magnification selecting keys 111 to 114 etc., and the detailed description of the above input processings are omitted herein.

Figure 9A:
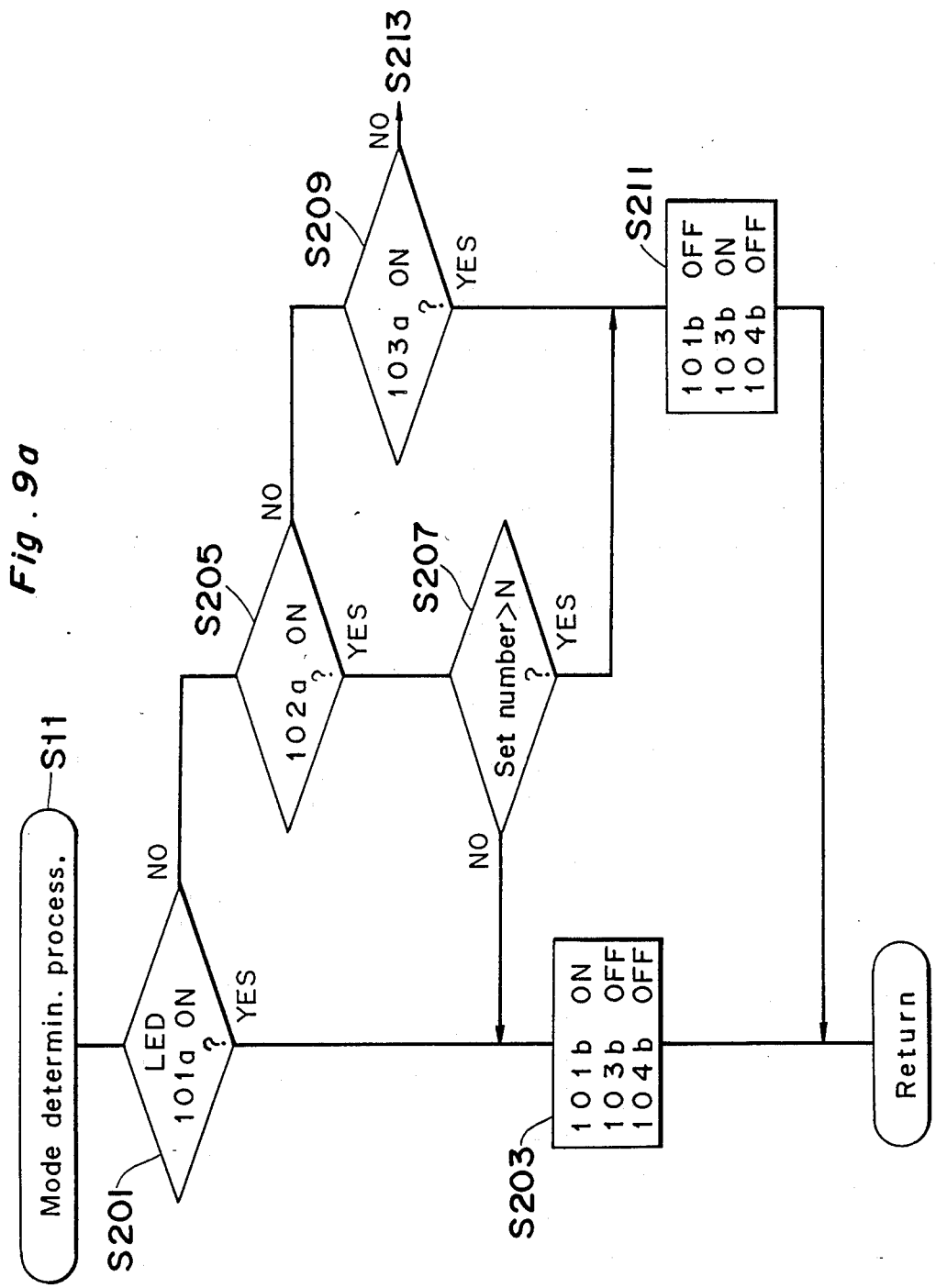
FIGS. 9a and 9b are flow charts showing a mode determination processing subroutine called in the control processing of the CPU1 shown in FIG. 4.
Figure 9B:
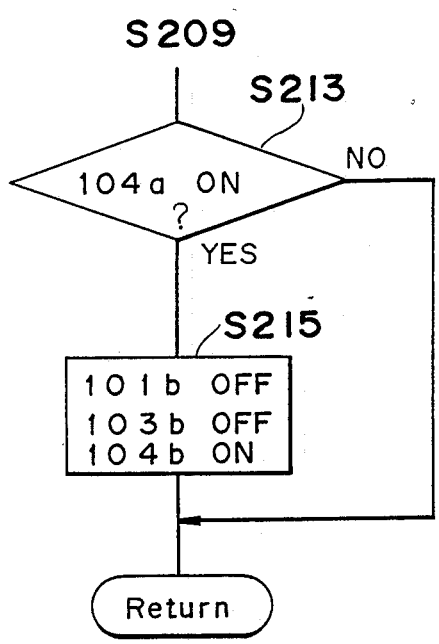

(2) Mode Determination processing (FIGS. 9a and 9b)

The mode determination processing subroutine is called at step S11 of FIG. 4 of the processing of the CPU1, and is the processing for determining that the copying mode, the master forming mode or the printing mode should be set.

When the copy instructing display LED 101a is turned on (Yes at step S201), the copying mode display LED 101b is turned on and the copying mode is set at step S203, and thereafter, the master forming mode display LED 103b and the printing mode display LED 104b are turned off.

When the master forming instructing display LED 103a is turned on (Yes at step S209), the master forming mode display LED 103b is turned on and the master forming mode is set at step S211, and thereafter, the copying mode display LED 101b and the printing mode display LED 104b are turned off.

When the print instructing display LED 104a is turned on (Yes at step S213), the printing mode display LED 104b is turned on and the printing mode is set at step S215, and thereafter, the copying mode display LED 101b and the master forming mode display LED 103b are turned off.

On the other hand, when the automatic operation instructing display LED 102a is turned on (Yes at step S205), it is judged at step S207 whether or not the numerical value set as the number of copying or printing paper sheets is larger than a predetermined threshold number N of copying or printing paper sheets for selecting the copying mode or the printing mode. When the set numerical value is larger than the threshold number N at step S207, the program flow goes to step S211, and the master forming mode is set. On the other hand, when the set numerical value is not larger than the threshold number N at step S207, the program flow goes to step S203, and the copying mode is set.

Figure 10A:
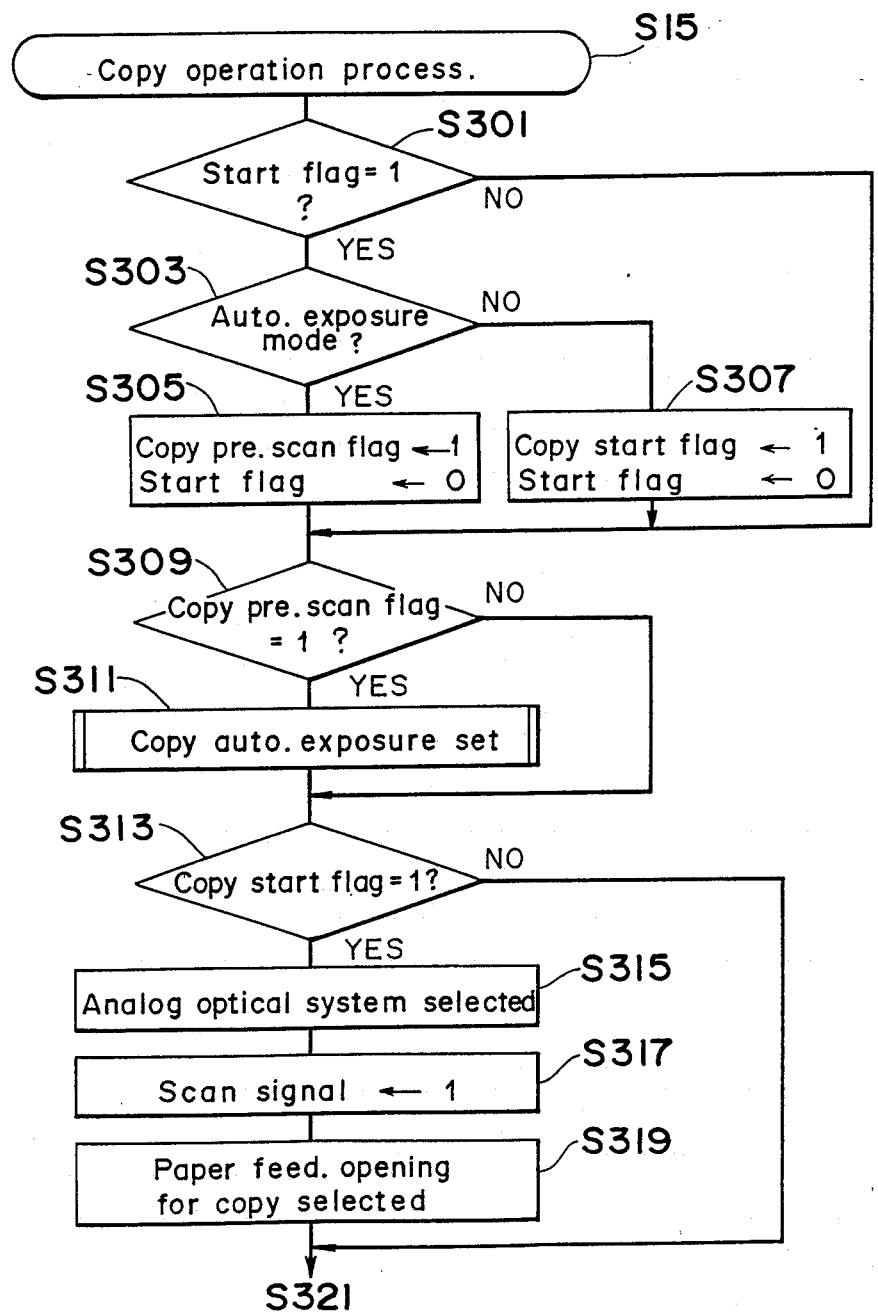
FIGS. 10a and 10b are flow charts showing a copying operation processing subroutine called in the control processing of the CPU1 shown in FIG. 4.
Figure 10B:
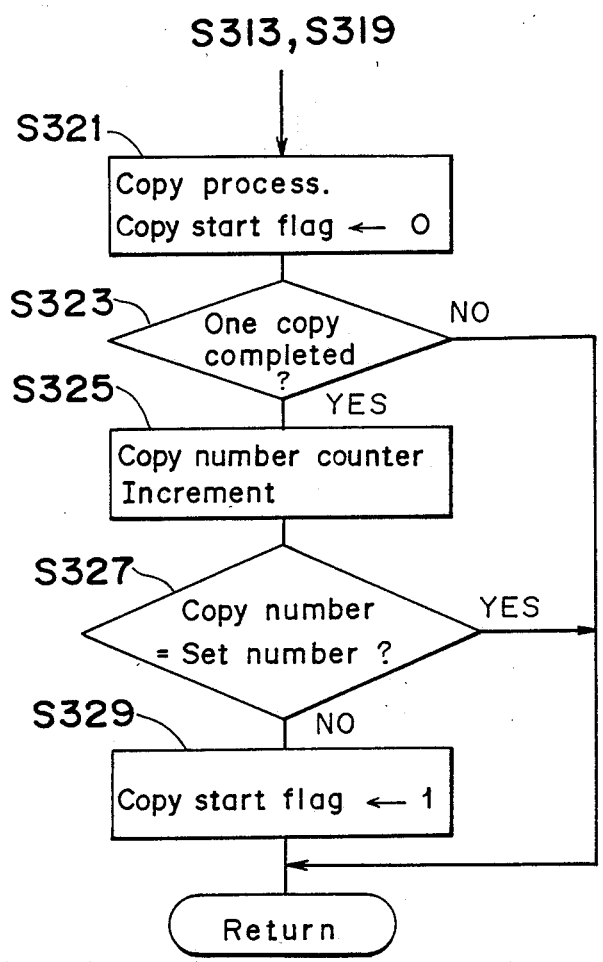

(3) Copying Operation Processing (FIGS. 10a and 10b)

The copying operation processing subroutine is called at step S15 of FIG. 4 of the processing of the CPU1, and is the routine for controlling the operation of the copying section 4 such as the control of the devices arranged around the photoconductor drum 401 etc.

The present subroutine is executed (See step S13 of FIG. 4), when the copying mode is set (See step S203 of FIG. 9a).

Steps S301 to S307 are executed when the start flag is set.

That is, when the start flag is set (Yes at step S301), it is judged whether or not the set mode is the automatic exposure mode at step S303. In the case of the automatic exposure mode (Yes at step S303), a copying preliminary scan flag is set and the start flag is reset at step S305. On the other hand, when the automatic exposure mode is not set (No at step S303), a copying start flag is set and the start flag is reset at step S307.

Steps S309 to S311 are the processings for calling the copying automatic exposure setting subroutine (which is the processing for automatically setting the exposure amount for the copying operation, and is described below in the description of FIG. 11), when the copying preliminary scan flag is set (Yes at step S309).

Steps S313 to S319 are the processings executed when the copying start flag is set (Yes at step S313).

First of all, the analog optical system is selected as the optical system at step S315. Concretely, a control signal outputted to a driving circuit of an actuator (not shown) for rotating the switching mirror 351 arranged at the forward position of the photoconductor drum 401 is generated so that the switching mirror 351 is set at the position P1 shown in FIG. 1.

Thereafter, the scan signal to be transmitted to the CPU2 for controlling the optical system 3 is generated at step S317. The CPU2 starts the scan processing in accordance with the scan signal, as described above. (See steps S27 and S29 of FIG. 5.)

The paper feeding opening for the copying paper sheet is selected as the paper feeding opening for passing through the printing paper sheet at step S319. Concretely, the paper feeding openings corresponding to the printing master sheet supply cassette 501 and the printing paper sheet supply cassette 601 are not selected, and the paper feeding opening corresponding to the cassette 421 or the cassette 422 is selected. The processing for determining whether the cassette 421 or the cassette 422 is selected is executed in a known manner when the copying paper sheet size selecting key 121 (See FIG. 2) is pressed, and the description of the above processing is omitted herein.

Step S321 is the processing for controlling the copying operation. At step S321, the operations of forming of an electrostatic latent image, developing of the latent image in visible toner image, transporting of the paper sheet, transferring of the toner image and fixing of the toner image etc. are executed at predetermined timings respectively, in accordance with timing signals and return signals transmitted from the CPU2, and also the copying start flag is reset.

Steps S323 to S329 are the processings for preparing for the next copying operation.

That is, whenever the copying operation of one copying paper sheet is completed (Yes at step S323), the count value of a copying paper sheet number counter is increased by one at step S325, and the copying start flag is set again until the count value of the copying paper sheet number counter is equal to the number of copying paper sheets input by the ten key 131 at steps S327 and S329.

Figure 11:
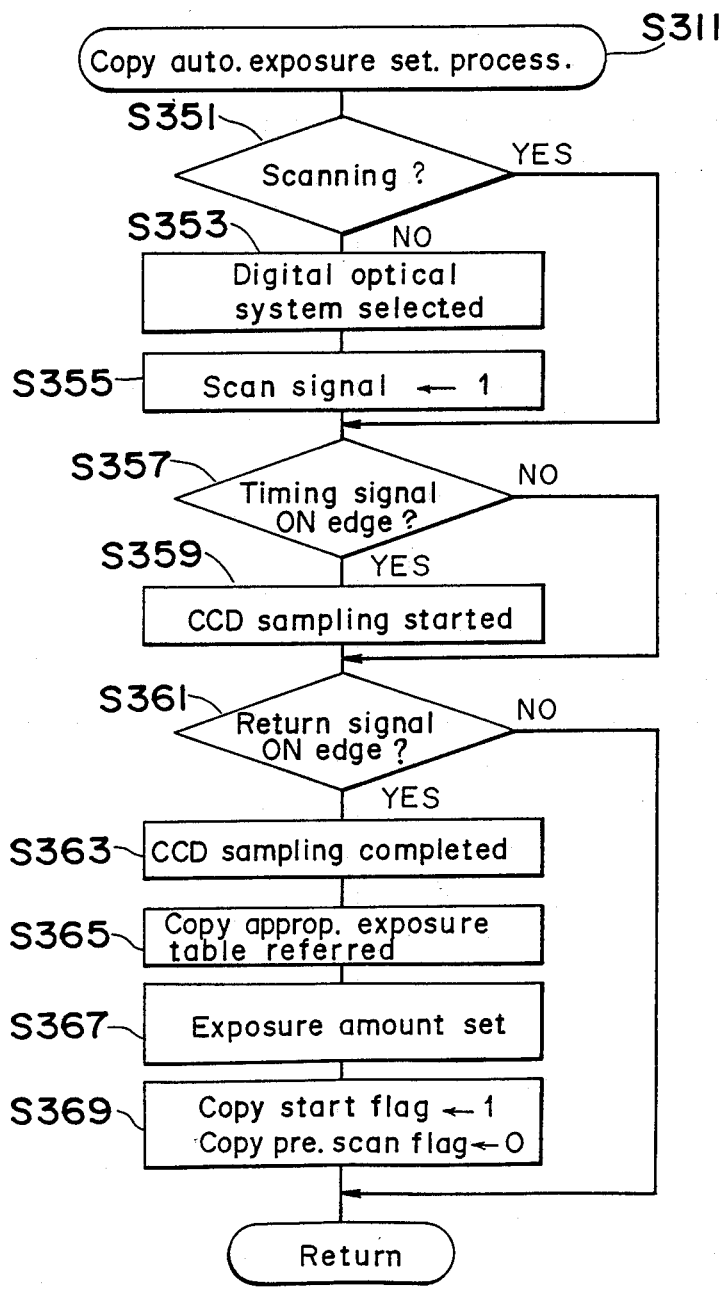
FIG. 11 is a flow chart showing a copying automatic exposure setting processing subroutine called in the copying operation processing subroutine showing in FIGS. 10a and 10b.

(3) Copying Automatic Exposure setting processing (FIG. 11)

The copying automatic exposure setting processing is the subroutine (step S311 of FIG. 10a) called in the copying operation processing of the CPU1, and is executed on condition that the copying preliminary scan flag is set. (See step S309 of FIG. 10a.)

When the optical system 3 is not performing the scan operation (No at step S351), the digital optical system is selected at step S353. Concretely, a control signal outputted to the driving circuit of the actuator (not shown) for rotating the switching mirror 351 arranged at the forward position of the photoconductor drum 401 is generated so that the switching mirror 351 is set at the position P2 shown in FIG. 1. The scan signal to be transmitted to the CPU2 for controlling the optical system 3 is generated at step S355. The CPU2 starts the scan processing in accordance with the scan signal, as described above. (See steps S27 and S29 of FIG. 5a.)

On the other hand, when the optical system 3 is performing the scan operation (Yes at step S351), the program flow goes to step S357.

Thereafter, when the ON edge of the timing signal from the CPU2 for controlling the optical system 3 is detected (Yes at step S357), the image sampling is started by the CCD image sensor 551 at step S359. It is to be noted that the timing signal is outputted at a timing when the scan reaches the end portion of the image.

Thereafter, when the ON edge of the return signal from the CPU2 for controlling the optical system 3 is detected (Yes at step S361), the image sampling executed by the CCD image sensor 551 is completed at step S363. An appropriate exposure amount for the copying operation is set based on the sampled values at step S367, after referring to a copying appropriate exposure amount table comprised herein at step S365. Thereafter, the copying start flag is set so as to prepare for the copying operation, and the copying preliminary scan flag is reset at step S369. It is to be noted that the return signal is outputted at a timing when the return operation of the scanner to the original position is started after the scan operation.

Figure 12A:
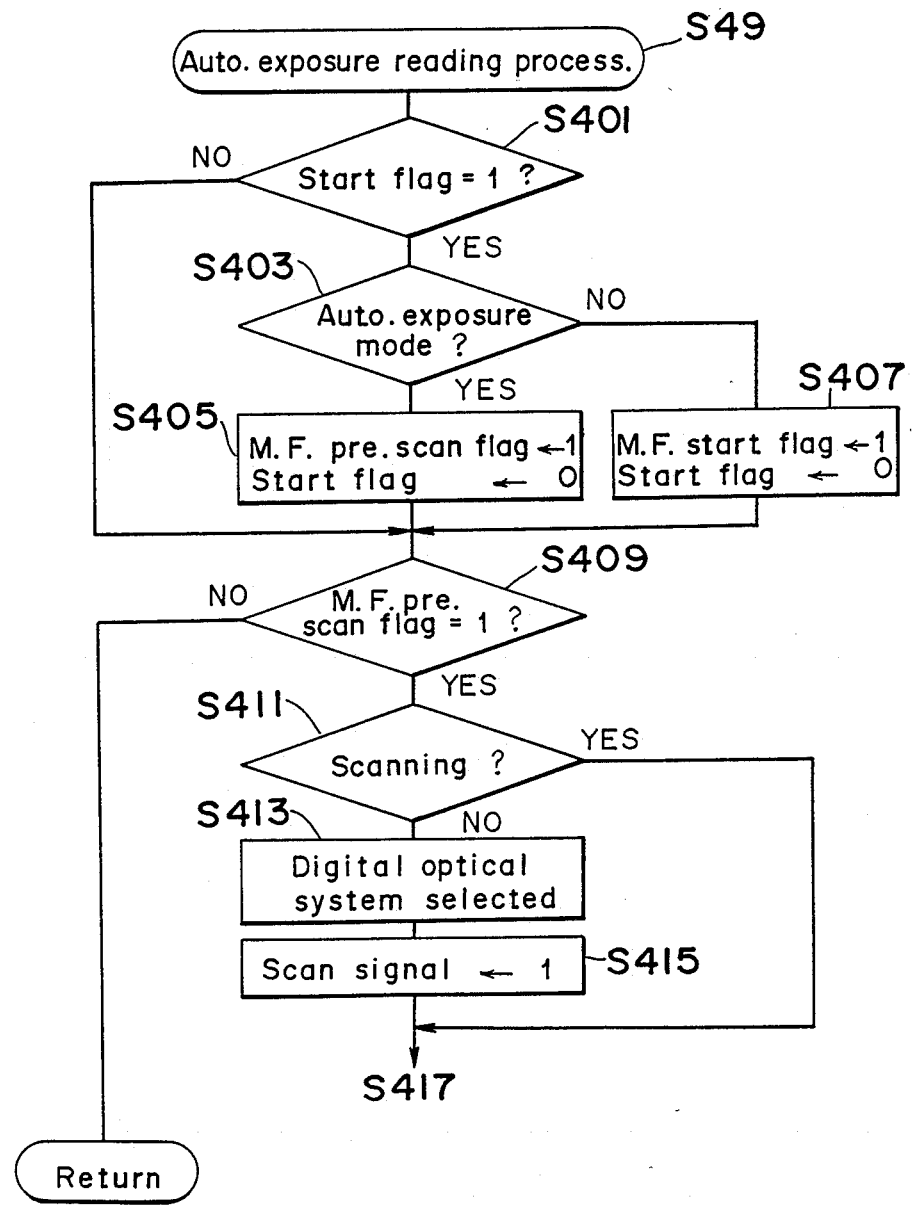
FIGS. 12a and 12b are flow charts showing an automatic exposure reading processing subroutine called in the control processing of the CPU3 shown in FIGS. 6a and 6b.
Figure 12B:
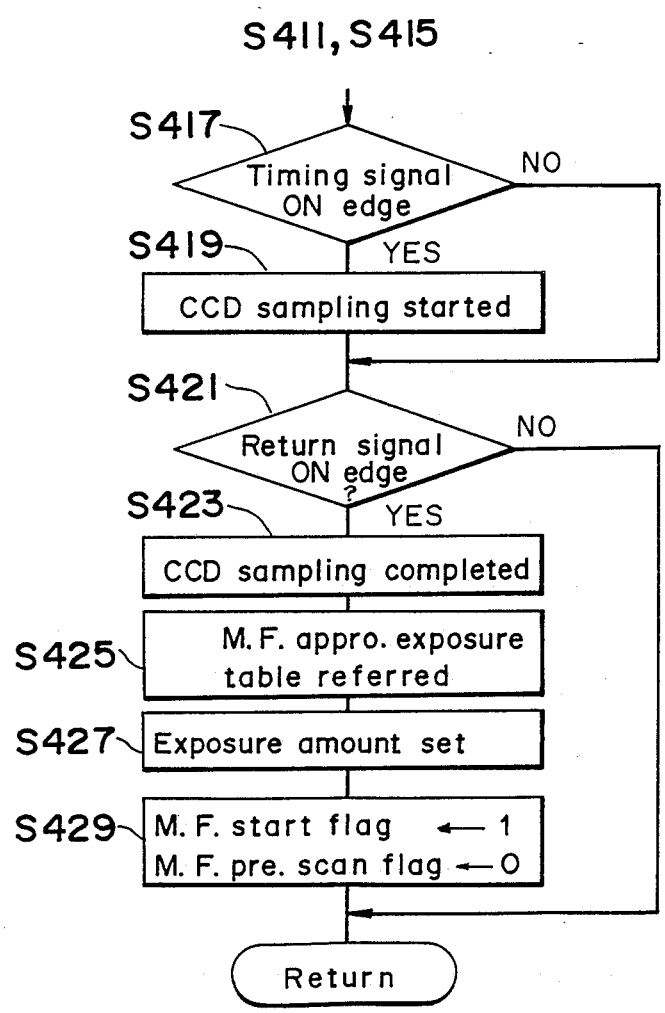

(4) Automatic Exposure Reading Processing (FIGS. 12a and 12b)

The automatic exposure reading processing is the subroutine (step S49 of FIG. 6a) called in the processing of the CPU3, and is executed on condition that the master forming mode is set. (See step S47 of FIG. 6a.)

Steps S403 to S407 are the processings executed when the start flag is set at step S401.

When the start flag is set (Yes at step S401), it is judged whether or not the exposure mode is the automatic exposure mode at step S403. In the case of the automatic exposure mode (Yes at step S403), a master forming preliminary scan flag is set and the start flag is reset at step S405. On the other hand, when the automatic exposure mode is not set (No at step S403), the master forming start flag is set and the start flag is reset at step S407. Thereafter, the program flow goes to step S409.

On the other hand, when the start flag is not set (No at step S401), the program flow goes to step S409.

At step S409, it is judged whether or not the master forming preliminary scan flag is set. When the master forming preliminary scan flag is set (Yes at step S409), the master forming automatic exposure setting processing is executed at steps S411 to S429. On the other hand, the master forming preliminary scan flag is not set (No at step S409), the program flow returns.

When the optical system 3 is not performing the scan operation (No at step S411), the digital optical system is selected at step S413. Concretely, a control signal outputted to the driving circuit of the actuator (not shown) for rotating the switching mirror 351 arranged at the forward position of the photoconductor drum 401 is generated so that the switching mirror 351 is set at the position P2 shown in FIG. 1.

The scan signal to be transmitted to the CPU2 for controlling the optical system 3 is generated at step S415. The CPU2 starts the scan processing in accordance with the scan signal, as described above. (See steps S27 and S29 of FIG. 5.) Thereafter, the program flow goes to step S417. On the other hand, when the optical system 3 is performing the scan operation (Yes at step S411), the program flow goes to step S417.

When the ON edge of the timing signal from the CPU2 for controlling the optical system 3 is detected (Yes at step S417), the image sampling is started by the CCD image sensor 551 at step S419, and thereafter, the program flow goes to step S421. The timing signal is outputted at a timing when the scan reaches the end portion of the image. On the other hand, when the ON edge of the timing signal from the CPU2 is not detected (No at step S417), the program flow goes to step S421.

Thereafter, when the ON edge of the return signal from the CPU2 for controlling the optical system 3 is detected (Yes at step S421), the image sampling executed by the CCD image sensor 551 is completed at step S423. An appropriate exposure amount for the master forming operation is set based on the sampled values at step S427, after referring to the master forming appropriate exposure amount table comprised herein at step S425. Thereafter, the master forming start flag is set so as to prepare for the master forming operation and the master forming preliminary scan flag is reset at step S429. The return signal is outputted at a timing when the return operation of the scanner to the original position is started after the scan operation.

Figure 15:
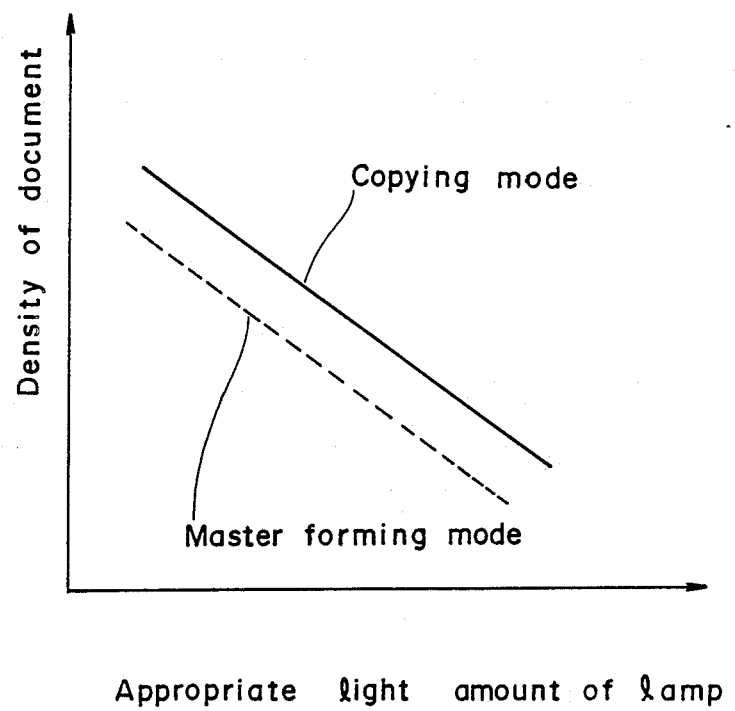
FIG. 15 is a graph showing the relationship between an appropriate light amount of a lamp and a density of a document in a copying mode and a master forming mode.

As described above, the copying appropriate exposure amount table and the master forming appropriate exposure amount table are comprised separately, because it is necessary to set the appropriate exposure amounts corresponding to the sensitivities of the photoconductor drum 401 and the CCD image sensor 551, respectively. Concretely, as shown in FIG. 15, in the case that the sensitivity of the photoconductor drum 401 is smaller than that of the CCD image sensor 551, the light amount in the copying mode should be set so as to be larger than that in the master forming mode for a document having a predetermined density.

Figure 13A:
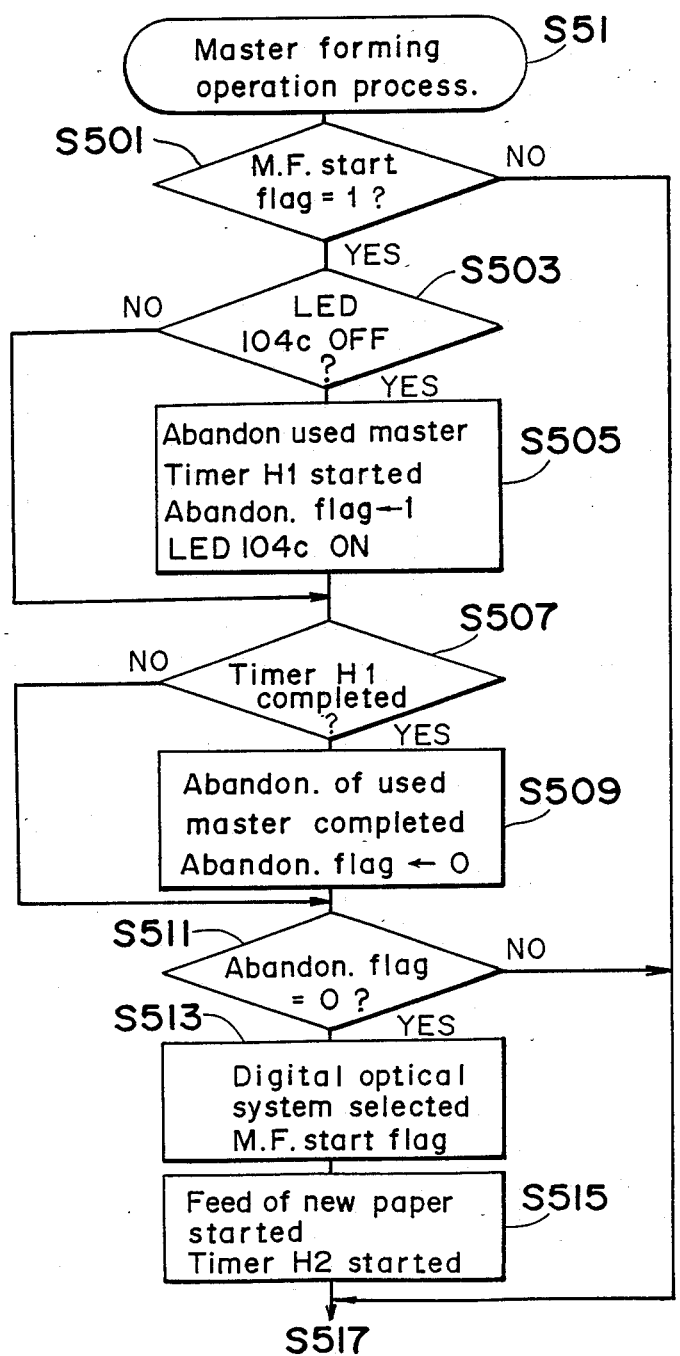
FIGS. 13a and 13b are flow charts showing a master forming operation processing subroutine called in the control processing of the CPU3 shown FIGS. 6a and 6b.
Figure 13B:
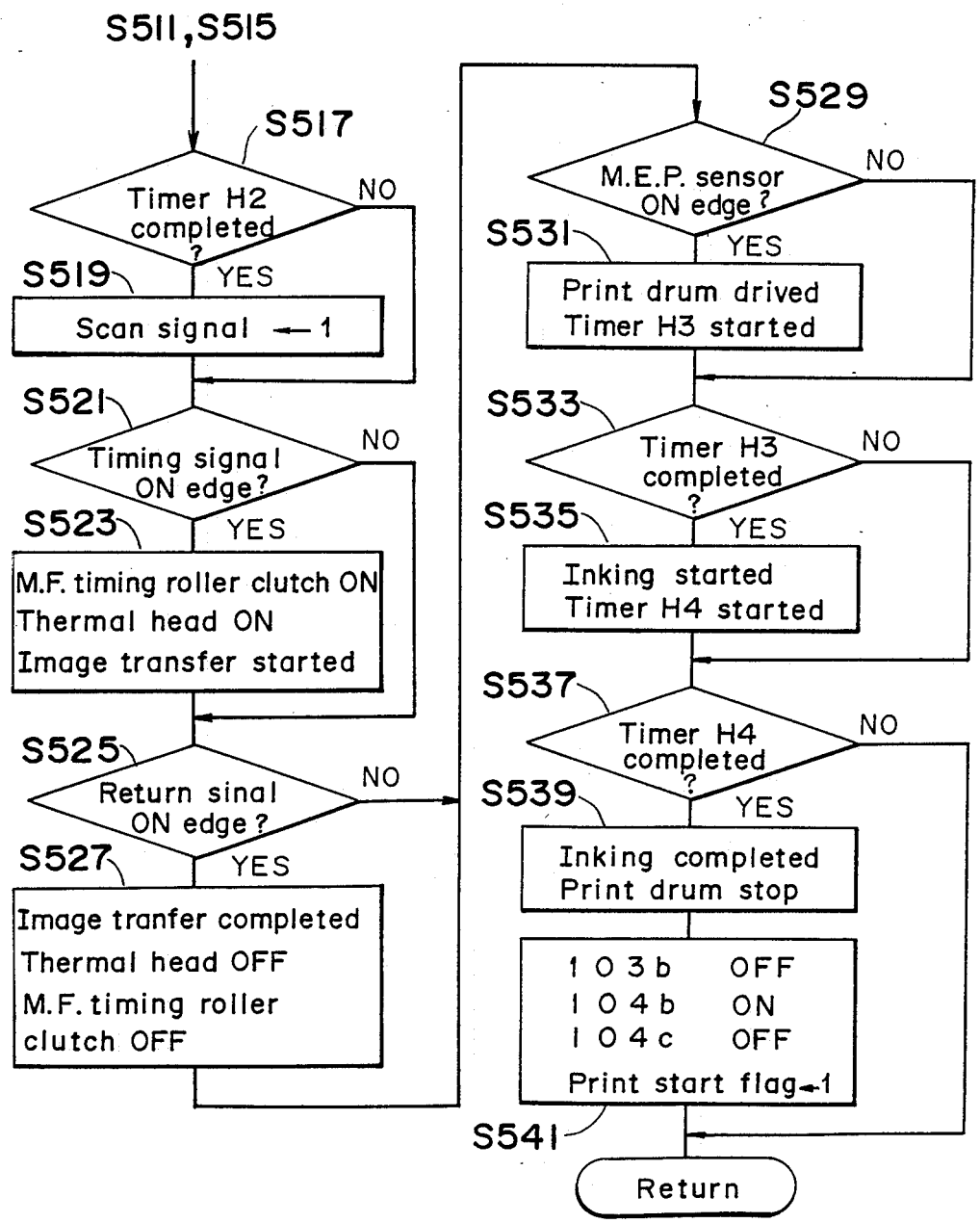

(5) Master Forming Operation Processing (FIGS. 13a and 13b)

The master forming operation processing is the subroutine (step S51 of FIG. 6a) called in the processing of the CPU3, and is executed on condition that the master forming start flag is set. (See step S407 of FIG. 12a and step S429 of FIG. 12b.)

When the master forming start flag is set (Yes at step S501), it is judged whether or not the no master warning display LED 104c is turned off at step S503. When the no master warning display LED 104c is turned off (Yes at step S503), the abandonment processing of the used printing master sheet is started, a timer H1 is started, an abandoning flag is set, and the no master warning display LED 104c is turned on at step S505. The timer H1 is provided for counting the executing time interval of the abandonment operation for the used printing master sheet.

At step S507, it is judged whether or not the timer H1 counts the predetermined time interval. When the timer H1 counts the predetermined time interval (Yes at step S507), the abandonment operation for the used printing master sheet is completed and the abandoning flag is reset at step S509, and thereafter, the program flow goes to step S511. On the other hand, when the timer H1 does not count the predetermined time interval (No at step S507), the program flow goes to step S511.

When the abandoning flag is reset (Yes at step S511), the digital optical system is selected and the master forming start flag is reset at step S513. In the selecting operation of the digital optical system, concretely, a control signal outputted to the driving circuit of the actuator (not shown) for rotating the switching mirror 351 arranged at the forward position of the photoconductor drum 401 is generated so that the switching mirror 351 is set at the position P2.

Thereafter, feeding of the new printing paper sheet from the paper cassette 501 is started and a timer H2 is started at step S515, and thereafter, the program flow goes to step S517. The timer H2 is provided for counting a predetermined time interval so as to generate the scan signal at a predetermined timing.

On the other hand, the abandoning flag is set (No at step S511), the program flow goes to step S517.

When the timer H2 counts the predetermined time interval (Yes at step S517), the scan signal is generated so as to be outputted to the CPU2 for controlling the optical system 3 at step S519. The CPU2 starts the scan operation in accordance with the scan signal, as described above. (See steps S27 and S29 of FIG. 5a.)

Thereafter, when the ON edge of the timing signal from the CPU2 for controlling the optical system 3 is detected (Yes at step S521), the clutch of the master forming timing roller 503 is turned on so as to start the paper feeding, the thermal head 552 is turned on, and transferring of an image signal (which is the image signal outputted from a buffer memory for storing one line of the image signal, after the signal outputted from the CCD image sensor 551 is processed) from the CCD image sensor 551 is started at step S523.

Thereafter, when the ON edge of the return signal from the CPU2 is detected (Yes at step S525), transferring of the image signal is completed, the thermal head 552 is turned off, and the clutch of the master forming roller 503 is turned off at step 527.

Thereafter, when the ON edge of the signal outputted from the printing master sheet end portion detecting sensor 521 is detected (Yes at step S529), drive of the printing drum 532 is started, and a timer H3 is started at step S531. The timer H3 is provided for counting a predetermined time interval so as to start the inking operation at a predetermined timing.

When the timer H3 counts the predetermined time interval (Yes at step S533), the inking operation is started, and a timer H4 is started at step S535. The timer H4 is provided for counting a predetermined time interval so as to stop the printing operation at a predetermined timing.

When the timer H4 counts the predetermined time interval (Yes at step S537), the inking operation is completed, and the operation of the printing drum 532 is stopped at step S539. Thereafter, the printing mode display LED 104b is turned on so as to set the printing mode, the master forming mode display LED 103b and the no paper warning display LED 104c are turned off, and the printing start flag is set at step S541.

Figure 14A:
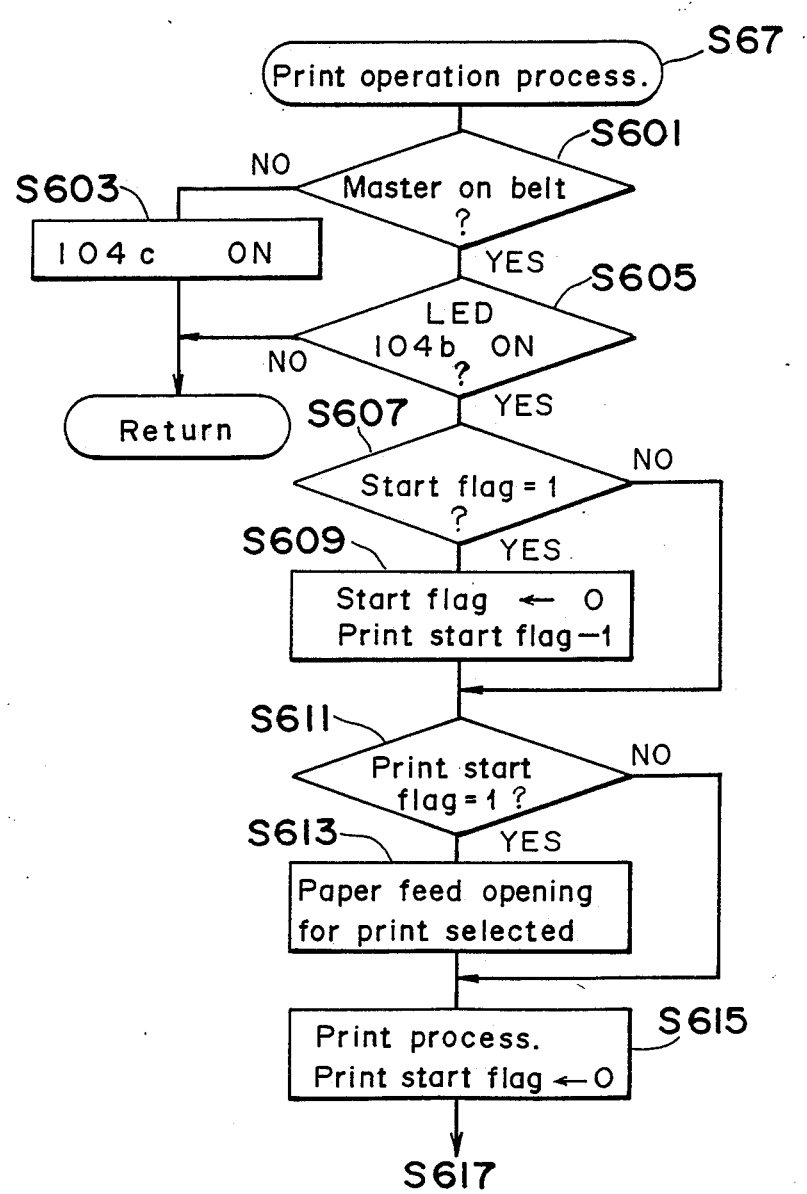
FIGS. 14a and 14b are flow charts showing a printing operation processing subroutine called in the control processing of the CPU4 shown in FIGS. 7a and 7b.
Figure 14B:
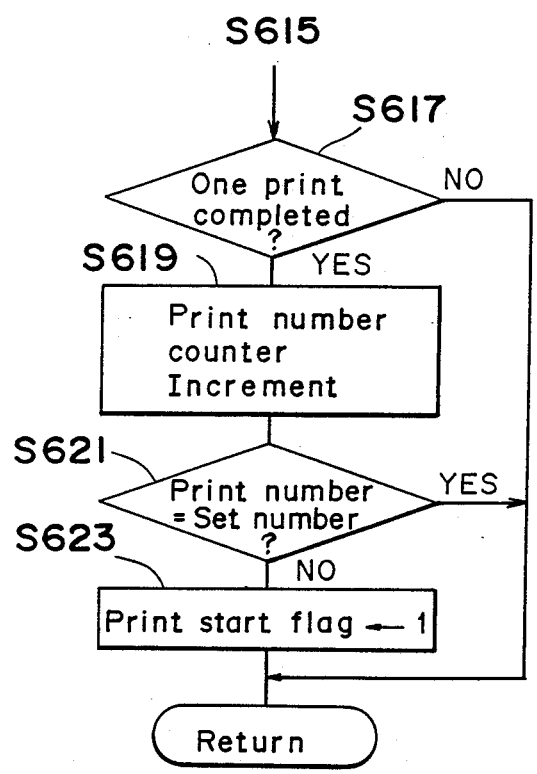

(6) Printing Operation Processing (FIGS. 14a and 14b)

The printing operation processing is the subroutine (step S67 of FIG. 7a) called in the processing of the CPU4, and is the routine for controlling the operation of the printing section 6.

At step S601, it is judged whether or not the printing master sheet exists on the printing belt 531.

When the printing master sheet does not exist thereon (No at step S601), the no master warning display LED 104c is turned on at step S603, and thereafter, the program flow returns. On the other hand, when the printing master sheet exists thereon (Yes at step S601) and the printing mode is not set (No at step S605), the program flow returns.

Furthermore, when the printing master sheet exists thereon (Yes at step S601) and the printing mode is set (Yes at step S605), it is judged whether or not the start flag is set at step S607.

When the start flag is set (Yes at step S607), the start flag is reset and the printing start flag is set at step S609, and thereafter, the program flow goes to step S611. On the other hand, when the start flag is not set (No at step S607), the program flow goes to step S611.

When the printing start flag is set (Yes at step S611), the paper feeding opening corresponding to the cassette 601 is selected as the paper feeding opening for the printing paper sheet at step S613, and thereafter, the program flow goes to step S615. On the other hand, the printing start flag is not set (No at step S611), the program flow goes to step S615.

At step S615, the printing processing is executed. Step S615 is the processing for controlling the real printing operation in a known manner, such as feeding of the printing paper sheet, the rotational drive of the printing drum 532, the linking operation, the up and down movements of the pressure welding roller 605, exhausting of the printing paper sheet etc., and the detailed description of the printing processing is omitted herein. At step S615, the printing flag is reset.

When the printing processing for one printing paper sheet is completed (Yes at step S617), the printing paper sheet number counter is increased by one at step S619, and the printing start flag is set again so as to prepare for the next printing processing until the count value of the printing paper sheet number counter is equal to the set number of printing paper sheets at steps S621 and S623.

As described above, the operation of the copying and printing apparatus of the present preferred embodiment is controlled.

Modifications of Embodiment

The modifications of the above preferred embodiment within the scope of the claims appended hereto will be described below.

In the above preferred embodiment, in order to switch over between the analog optical system and the digital optical system, the switching mirror 351 is arranged on the light path of the analog optical system, or is not arranged thereon by rotating it so that it is set at the positions P2 or P1, respectively. However, a complete analog optical system and a complete optical system may be constructed separately.

For example, the CCD image sensor 551 may be arranged under the document table 311 so that the CCD image sensor 551 can scan the document arranged on the document table 311.

In the above preferred embodiment, forming of the printing master is executed by the thermal head 552, however, another means may be used for forming the printing master.

In the above preferred embodiment, the stencil printing is described as one example of the printing process, however, the other printing processes such as offset printing etc. may be used.

Furthermore, the scan speed may be changed between the printing mode and the master forming mode so as to decrease the capacity of the buffer memory of the digital processing system.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A copying and printing apparatus comprising:
   a table for supporting a document thereon;
   a copying system for producing a copy of the document supported on said table in an electrophotographic process;
   an image reading system for reading an image of the document supported on said table so as to generate image data according to the read image;
   a master forming system for forming a printing master according to the image data generated by said image reading system; and
   a printing system for printing using the printing master formed by said master forming system.

2. A copying and printing apparatus comprising:
   a document supporting means for supporting a document;
   a light source for illuminating the document supported by said document supporting means;
   a copying means for producing a copy of the document in an electrophotographic process;
   an image reading means for reading an image of the document so as to generate image data according to the read image;
   a transmitting means for transmitting the lightwise image reflected by the document to said copying means and said image reading means;
   a master forming means for forming a printing master according to the image data generated by said image reading means; and
   a printing means for printing using the printing master formed by said master forming means.

3. A copying and printing apparatus as claimed in claim 2, further comprising:
   an automatic exposure means for adjusting an exposure amount of the illumination of said light source according to the image data generated by said image reading means upon a preliminary operation.

4. A copying and printing apparatus as claimed in claim 3, wherein said automatic exposure means alters the exposure amount between the operation of said copying means and the operation of said image reading means.

5. A copying and printing apparatus as claimed in claim 2, wherein said image reading means comprises:
   an image sensor for converting the lightwise image of the document to an electric signal; and
   an image processing means for generating image data according to the electric signal from said image sensor.

6. A copying and printing apparatus comprising:
   a document supporting means for supporting a document;
   a copying means for producing a copy of the document in an electrophotographic process;
   an image reading means for reading an image of the document so as to generate image data according to the read image;
   a master forming means for forming a printing master according to the image data generated by said image reading means;
   a printing means for printing using the printing master formed by said master forming means;
   an input means for inputting a number of copying or printing paper sheets to be produced; and
   a control means for activating said copying means when the number of the sheets input by said input means is not larger than a predetermined value, and activating said image reading means, said master forming means and said printing means when the number of the sheets input by said input means is larger than the predetermined value.

7. A copying and printing apparatus as claimed in claim 6, further comprising:
   an automatic exposure means for adjusting an exposure amount of the illumination of said light source according to the image data generated by said image reading means upon a preliminary operation.

8. A copying and printing apparatus as claimed in claim 7, wherein said automatic exposure means alters the exposure amount between the operation of said copying means and the operation of said image reading means.

9. A copying and printing apparatus as claimed in claim 6, wherein said image reading means comprises:
   an image sensor for converting the lightwise image of the document to an electric signal; and
   an image processing means for generating image data according to the electric signal from said image sensor.

10. A copying and printing apparatus comprising:
    a document supporting means for supporting a document;
    a light source for illuminating the document supported by said document supporting means;
    a copying means having a photosensitive member for producing a copy of the document in an electrophotographic process;
    an image reading means having an image sensor for reading an image of the document so as to generate image data according to the read image;
    a transmitting means for transmitting the lightwise image reflecting by the document to said copying means and said image reading means;
    a master forming means for forming a printing master according to the image data generated by said image reading means;
    a mode setting means for setting a copying mode for activating said copying means, or a master forming mode for activating said master forming means;
    a memory means for storing a copying reference exposure amount table comprised of appropriate exposure amounts of the illumination of said light source in the copying mode corresponding to the sensitivity of the photosensitive member and densities of the document, and a master forming reference exposure amount table comprised of appropriate exposure amounts of the illumination of said light source in the master forming mode corresponding to the sensitivity of the image sensor and densities of the document; and a control means for setting an appropriate exposure amount of the illumination of said light source for the copying mode based on the image data generated by said image reading means referring to the copying reference exposure amount table stored by said memory means when the copying mode is set by said mode setting mode, and setting an appropriate exposure amount of the illumination of said light source for the master forming mode based on the image data generated by said image reading means referring to the master forming reference exposure amount table stored by said memory means when the master forming mode is set by said mode setting mode.

11. A copying and printing apparatus as claimed in claim 10, wherein said mode setting means comprises an input means for inputting the mode to be set.

12. A copying and printing apparatus as claimed in claim 10, wherein said mode setting means comprises:
an input means for inputting a number of copying or printing paper sheets to be produced; and
a mode determining means for setting the copying mode when the number of the sheets input by said input means is not larger than a predetermined value, and setting the master forming mode when the number of the sheets input by said input means is larger than the predetermined value.

13. A copying and printing apparatus comprising:
a table for supporting a document thereon;
a copying system for produce a copy of the document supported on said table in an electrophotographic process;
an image reading system for reading an image of the document supported on said table so as to generate image data according to the read image;
a master forming system for forming a printing master according to the image data generated by said image reading system;
a printing system for printing using the printing master formed by said master forming system;
a mode setting means for setting a copying mode for activating said copying system, or a printing mode for activating said printing system;
a copying paper supply means for supplying copying paper sheets;
a printing paper supply means for supplying printing paper sheets;
a copying paper feeding opening for passing the copying paper sheet therethrough from said copying paper supply means;
a printing paper feeding opening for passing the printing paper sheet therethrough from said printing paper supply means; and
a paper feeding opening selecting means for selecting said copying paper feeding opening when the copying mode is set by said mode setting means, and selecting said printing paper feeding opening when the printing mode is set by said mode setting means.

14. A copying and printing apparatus as claimed in claim 13, wherein said mode setting means comprises an input means for inputting the mode to be set.

15. A copying and printing apparatus as claimed in claim 13, wherein said mode setting means comprises:
an input means for inputting a number of copying or printing paper sheets to be produced; and
a mode determining means for setting the copying mode when the number of the sheets input by said input means is not larger than a predetermined value, and setting the printing mode when the number of the sheets input by said input means is larger than the predetermined value.

* * * * *

UNITED STATES PATENT AND TRADEMARK OFFICE
CERTIFICATE OF CORRECTION

PATENT NO. : 4,916,486

DATED : April 10, 1990

INVENTOR(S) : Keiji Nakatani

It is certified that error appears in the above-identified patent and that said Letters Patent is hereby corrected as shown below:

In col. 1, line 40, change "produce" to --producing--.

In col. 2, line 26, change "reflecting" to --reflected--.

In col. 2, line 57, change "produce" to --producing--.

In col. 3, line 52, change "showing" to --shown--.

In col. 5, line 13, change "are" to --is--.

In col. 5, line 34, change "allow" to --arrow--.

In col. 5, line 41, change "copy" to --copying--.

In col. 6, line 12, change "an" to --a--.

In col. 9, line 33, change "CPU" to --CPU3--.

In col. 10, line 13, change "steps" to --step--.

In col. 10, line 13, change "instruction" to --instructing--.

UNITED STATES PATENT AND TRADEMARK OFFICE
CERTIFICATE OF CORRECTION

PATENT NO. : 4,916,486

DATED : April 10, 1990

INVENTOR(S) : Keiji Nakatani

It is certified that error appears in the above-identified patent and that said Letters Patent is hereby corrected as shown below:

In col. 10, line 44, change "matter" to --master--.

In col. 16, line 30, change "linking" to --inking--.

In col. 19, line 32 (claims 13, line 3), change "produce" to --producing--.

Signed and Sealed this

Twenty-fifth Day of June, 1991

Attest:

Attesting Officer

HARRY F. MANBECK, JR.

Commissioner of Patents and Trademarks